United States Patent
Desai et al.

[11] Patent Number: 5,862,509
[45] Date of Patent: Jan. 19, 1999

[54] VEHICLE NAVIGATION USING TIMED TURN AND TIMED LANE RESTRICTIONS

[75] Inventors: Simon Desai; Margaret A. Sun, both of Sunnyvale, Calif.

[73] Assignee: Zexel Corporation, Tokyo, Japan

[21] Appl. No.: 771,020

[22] Filed: Dec. 20, 1996

[51] Int. Cl.⁶ ............................................. G06F 165/00
[52] U.S. Cl. ................... 701/209; 701/202; 701/210; 340/990; 340/995
[58] Field of Search .................... 701/200, 202, 701/207, 208, 209, 210, 211; 73/178 R; 340/988, 990, 995

[56] References Cited

U.S. PATENT DOCUMENTS

| | | | |
|---|---|---|---|
| 4,992,947 | 2/1991 | Nimura et al. | 340/995 |
| 5,172,321 | 12/1992 | Ghaem et al. | 701/202 |
| 5,272,638 | 12/1993 | Martin et al. | 340/990 |
| 5,369,588 | 11/1994 | Hayami et al. | 340/990 |
| 5,371,678 | 12/1994 | Nomura | 340/995 |

*Primary Examiner*—Gary Chin

[57] ABSTRACT

Methods for planning an optimum vehicle route from a selected origin to a selected destination with a selected departure time, taking account of the presence of timed turn restrictions and/or timed lane restrictions. Separate methods are provided for recalculation of a suitable route remainder, where an unanticipated timed turn or timed lane restriction or other traffic obstruction, such as a vehicle accident, is encountered enroute. Computations for an optimum route can be performed at the vehicle or at a station that communicates with the vehicle.

44 Claims, 15 Drawing Sheets

VEHICLE NAVIGATION USING TIMED TURN AND TIMED LANE RESTRICTIONS

FIELD OF THE INVENTION

This invention relates to vehicle navigation and to inclusion of the effects of vehicle traffic restrictions that vary with time.

BACKGROUND OF THE INVENTION

The availability of local position determination units (PDUs), such as LORAN-C, and of global position determination systems, such as the Navstar Global Positioning System (GPS), for tracking locations and location observation times of a PDU antenna has produced a marked growth in the number of vehicle navigation systems available. These navigation systems are used to track a vehicle as the vehicle moves, or to plan a route to be followed by the vehicle.

Different approaches for route planning navigation systems are discussed in U.S. Pat. Nos. 5,262,775, 5,291,412, 5,291,413, 5,291,414 and 5,303,159, issued to Tamai et al, U.S. Pat. No. 5,311,414, issued to Tamai, Nos. 5,359,529 and 5,508,931, issued to Snider, U.S. Pat. No. 5,377,113, issued to Shibazaki et al, U.S. Pat. No. 5,414,630, issued to Oshizawa et al, U.S. Pat. No. 5,430,655, issued to Adachi, U.S. Pat. No. 5,515,283, issued to Desai et al, U.S. Pat. Nos. 5,544,060 and 5,550,538, issued to Fujii et al, and U.S. Pat. No. 5,523,950, issued to Peterson.

When a vehicle moves along roads, streets and highways (collectively referred to as "roads", the vehicle encounters two kinds of restrictions on vehicle maneuverability: traffic restrictions that are always present ("non-lapsing vehicle restrictions" or NLVRs) and traffic restrictions that vary with the time of day, with the day of the week, or with the season ("timed vehicle restrictions" or TVRs). Examples of the timed vehicle restrictions include No-Left-Turn, No-Right-Turn and No-U-Turn restrictions that are imposed during commute or rush hours, specially marked traffic lanes that can be used only by "car pool" vehicles (carrying two or three or more persons) during commute or rush hours, and side lanes that can be used for vehicle parking during portions of the day that are not commute or rush hours. This invention is concerned with timed turn restrictions ("TTRs") and timed lane restrictions ("TLRs"), which are restrictions on vehicle turns and/or on use of traffic lanes that vary with the time of day, with the day of the week and/or with the season.

In many of the navigation systems, a timed turn restriction is treated in the corresponding navigation database as a non-lapsing turn restriction so that a vehicle turn at the corresponding TTR location is never available. If the restriction on this turn is present at all hours except late evening hours, such as 10:00 p.m.–5:00 a.m., treatment of this TTR as a NLVR may have little effect on route planning. If the restriction on this turn is imposed only during a small portion of the daytime hours, such as 3:00–6:00 p.m., treatment of this TTR as a NLVR substantially penalizes or constrains the route planning process.

In navigation databases that account for the number of lanes available for vehicle traffic on a given segment of a road (referred to herein as a "link"), the presence of a timed lane restriction is often ignored, and the lane is treated as if it is unavailable for vehicle traffic in any direction. This approach also substantially penalizes or constrains the route planning process, especially if the lane is available for travel in the desired direction during some times with low or unsaturated traffic density. A pre-scheduled and temporary restriction on a vehicle turn or on use of a traffic lane may be treated as non-lapsing, which is too pessimistic, or as non-existent, which offers a rude surprise for any vehicle that includes that turn or link as part of its planned route.

If the presence of one or more timed vehicle restrictions is to be accurately accounted for, many questions should be first posed and answered. How can one obtain accurate local time? When and how should a TVR be included in a route planning process? How should the presence of a TVR be presented to a vehicle operator or user? How should diversion around a TVR, and route recalculation, be handled enroute? How should this diversion around a TVR be presented to the user? How should the occurrence of an unanticipated traffic incident, such as a traffic accident or temporary closing of a street or temporary imposition of turn restrictions at an intersection, be handled when the vehicle is enroute between the route origin or source and the route destination? Answers to these questions and to related questions should be incorporated in any robust navigation system that utilizes route planning and optimization.

SUMMARY OF THE INVENTION

These questions are addressed and answered by the invention, which provides methods and apparatus for (i) route planning and optimization before a trip begins and (ii) recalculation of the remainder of a route, where a traffic incident or other unanticipated traffic barrier is encountered enroute that interferes with use of the originally planned route. This invention takes account of the presence of known timed turn restrictions and/or known timed lane restrictions and of the possibility that a relatively new TTR or TLR may appear that has not been incorporated in the route planning process. Optimum route determination can be performed initially, before a trip begins, and may be (re)performed enroute in response to encountering new traffic conditions, by incorporating the effect(s) of the presence of another TTR and/or TLR or of an unanticipated traffic barrier. Computations to (re)determine an optimum vehicle route can be performed on the vehicle, or at a central station, or can be shared between the vehicle and the central station.

DESCRIPTION OF BEST MODES OF THE INVENTION

Figure 1:
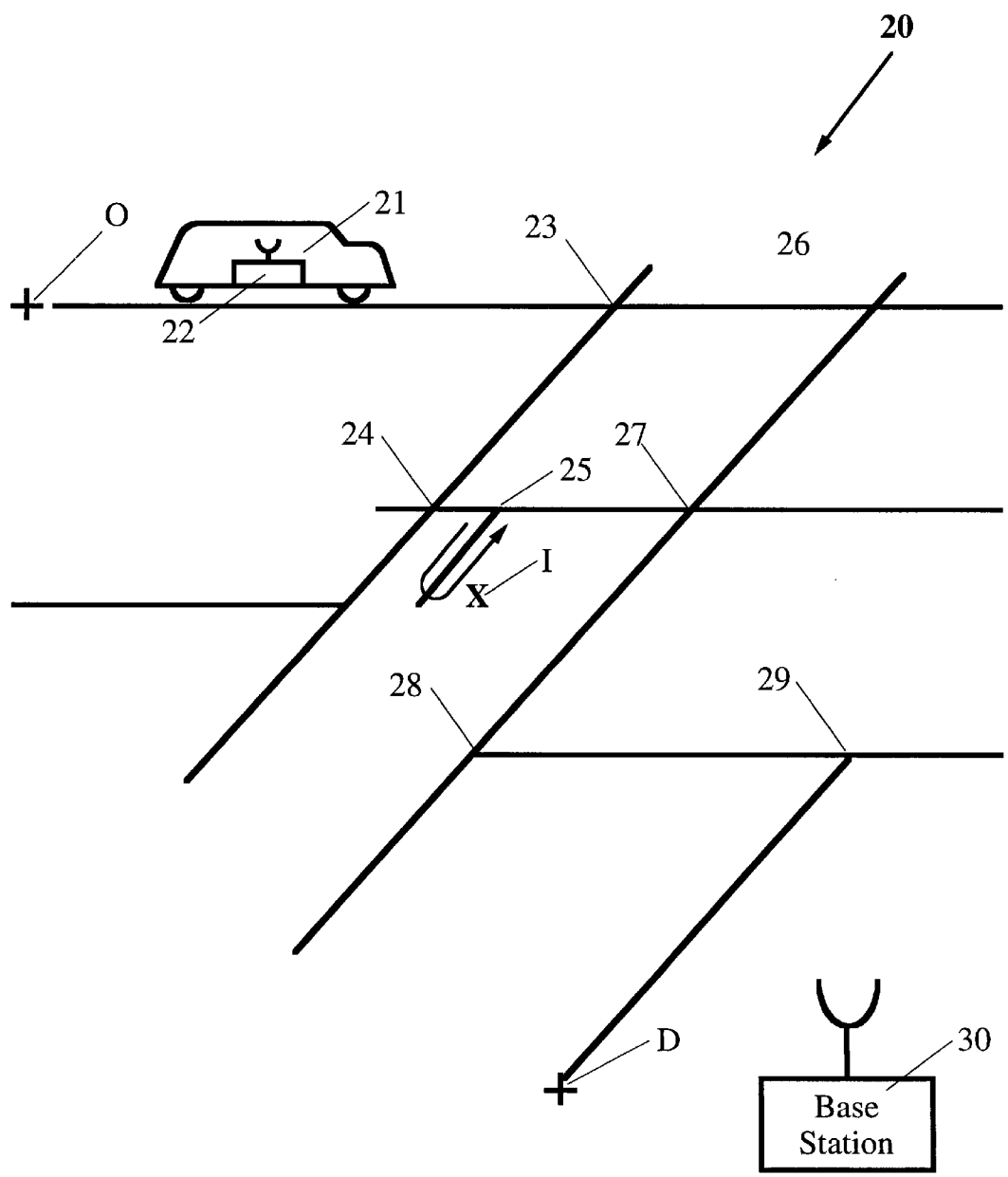
FIG. 1 schematically illustrates use of the invention in a typical situation.

FIG. 1 illustrates a simplified situation in which a vehicle 21 is to leave a specified trip origin location O at a specified time of departure (TD) and is to travel to a specified trip destination location D, using the available road, street and highway network 20. The vehicle 21 optionally carries a position determination (PD) system, such as GPS, GLONASS or LORAN-C, or an inertial navigation system, that can determine where the vehicle is presently located, with an inaccuracy that preferably is no greater than 10–50 meters. The network 20 includes one or more links; and if two or more links are included, the network 20 also includes one or more nodes, where two links cross or are joined together.

The vehicle 21 may proceed from the origin O to the destination D along several combinations or sequences of links, as suggested in FIG. 1. One such sequence of links is {O–23, 23–24, 24–25, 25–27, 27–28, 28–29, 29–D }, as shown in FIG. 1, where the vehicle 21 makes various rights turns, left turns and even U-turns in moving along this route. Another such sequence of links from the origin O to the destination D is {O–23, 23–26, 26–27, 27–28, 28–29, 29–D}. At least one route from the origin O to the destination D, connoted an "O–D route" herein, can be found that is optimal in some sense, such as (i) requiring the least estimated time, (ii) requiring the least estimated expenditure of vehicle fuel, (iii) requiring the least use of highways and/or freeways along the route, or (iv) some other measure of "cost" associated with the O–D route.

Extraneous constraints may be introduced along the O–D route to be used. For example, the vehicle 21 may be required to pick up or to deposit a person or object at an intermediate location I along the route. In this instance, the preferable route, with this constraint included, may be the route described by the sequence {O–23, 23–24, 24–25, 25–I, I–25, 25–27, 27–28, 28–29, 29–D}, with a U-turn possibly being required near the intermediate location I.

Figure 2:
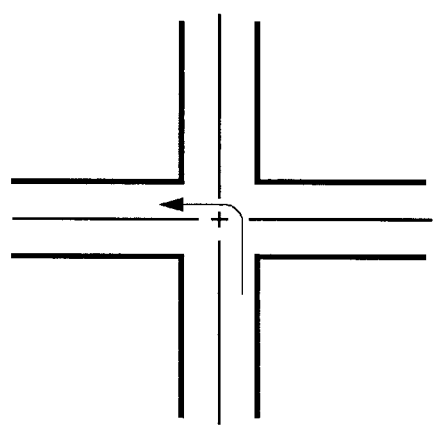
FIGS. 2 and 3 schematically illustrate typical turns that may be restricted by a TTR.
Figure 3:
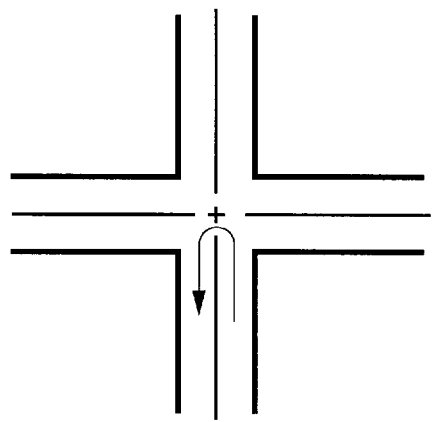

A given O–D route may require one or more left turns, right turns or U-turns, as illustrated in FIGS. 2 and 3. At certain times of the day, or during certain days of the week or seasons, a particular right turn, left turn or U-turn may be prohibited because of other considerations, including facilitation of movement of all vehicles along the adjacent links.

Figure 4A:
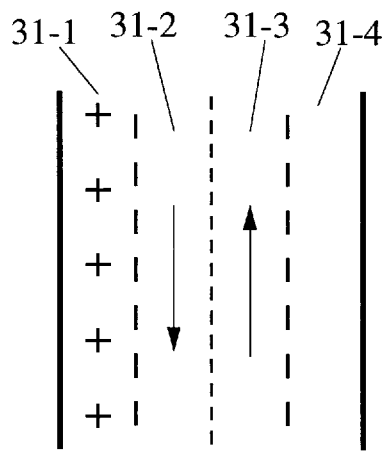
FIGS. 4A, 4B, 5A and 5B illustrate typical traffic lane restrictions that may be imposed by a TLR.
Figure 4B:
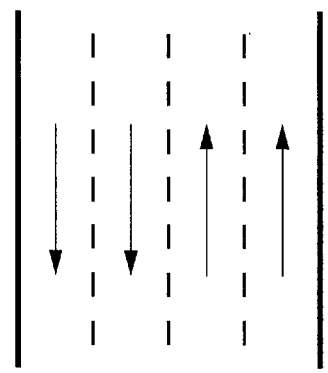
Figure 5A:
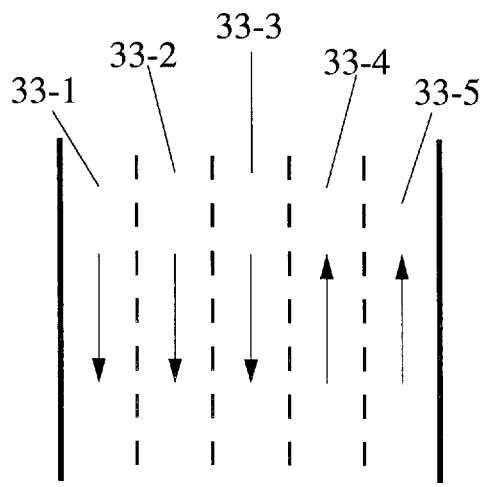
Figure 5B:
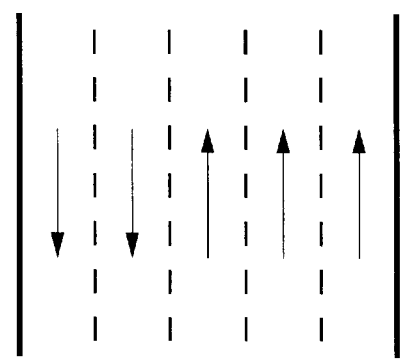

A given O–D route will require that the vehicle travel along one or more links, each of which may include one or more traffic lanes, such as lanes 31–1 and 31–4, shown in FIG. 4A, that allows parking of vehicles or other obstructions during certain times of the day or days of the week and that are "cleared" to provide additional traffic lanes during specified hours, such as commute or rush hours, as shown in FIG. 4B. A link may also include several lanes, such as the lanes 33–1, 33–2, 33–3, 33–4 and 33–5, shown in FIGS. 5A and 5B, for which traffic in an inner lane, such as 33–3, is oriented in a first direction during certain hours (FIG. 5A) and is oriented in a second, opposed direction during other hours (FIG. 5B).

The turn restrictions indicated in FIGS. 2 and 3, and the lane restrictions illustrated in FIGS. 4A, 4B, 5A and 5B, are examples of TTRs and TLRs, respectively, and are not intended to exhaust the possibilities of the time-based vehicle restrictions. Planning an optimum route, or responding to presence of an unanticipated traffic obstruction, time delay or other "cost," is enhanced if the time periods for which the TVRs apply can be explicitly used in the route (re)planning process.

Figure 6A:
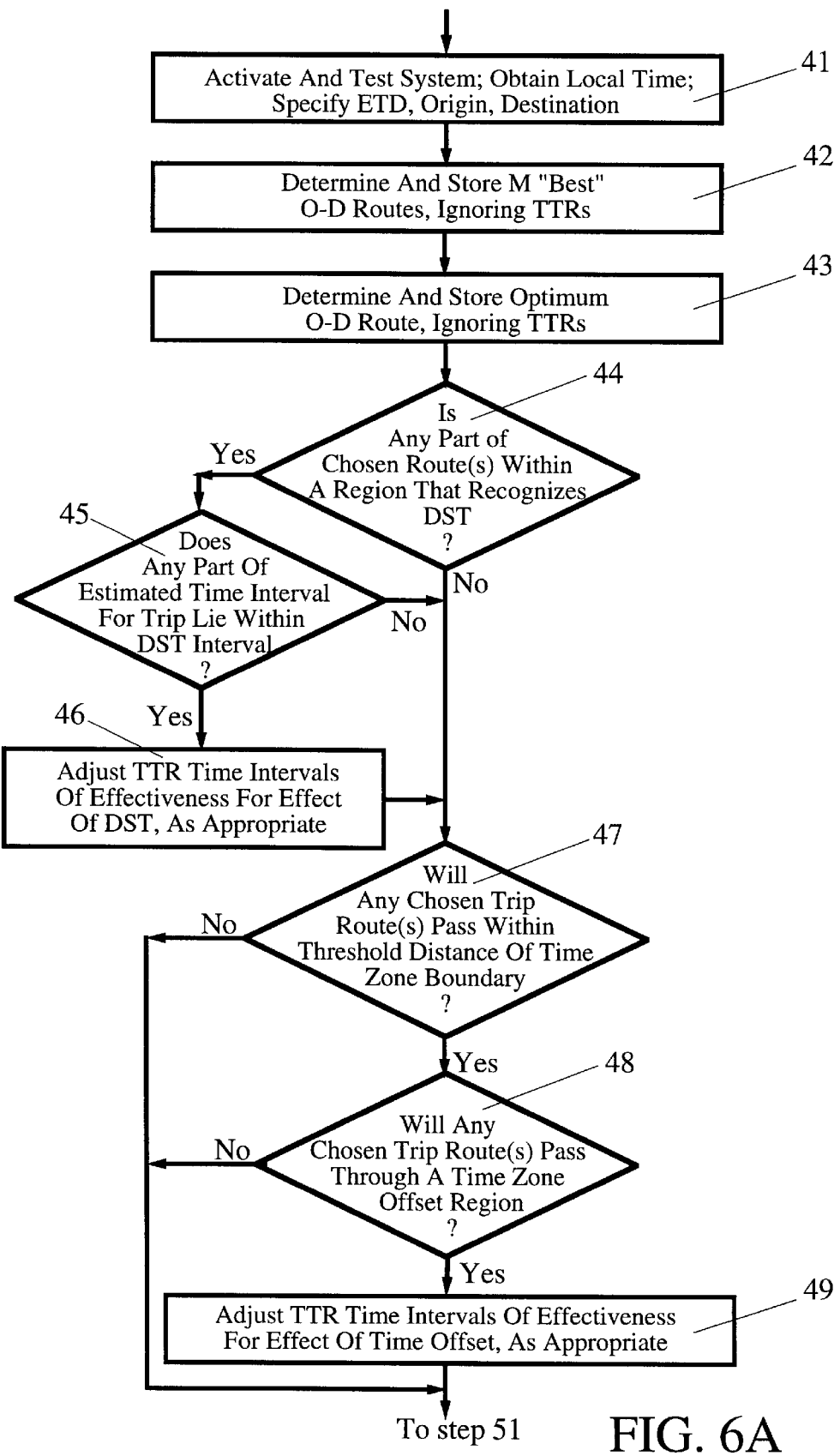
FIG. 6A/6B is a flow chart illustrating a route planning process that takes account of TTRs, according to one embodiment.

FIG. 6A/6B presents a flow chart of an embodiment of the invention for route planning that takes account of the presence of TTRs. In step 41, the system is activated and tested. This may include setting certain parameters equal to initial values and/or performing certain route planning calculations with known solutions; or this may include other initialization and test procedures. In this step the trip origin O and the trip destination D and estimated time of departure (ETD) are specified, and any preferred constraints are specified. The specified route constraints might include: (i) Minimize highway or freeway use throughout the trip; (ii) Avoid use of a specified link (which is known to be temporarily closed or subject to long time delays on the date(s) of the trip); or (iii) Pick up or deliver a person or some object at a specified address while the trip is in progress.

In step 42 (optional), the system calculates and stores the M "best" routes ($M \geq 1$), for future consideration, given the trip origin O, the trip destination D, the selected time of departure ETD and any applicable trip constraints, ignoring the presence of any TTRs for now. In step 43, the system calculates and stores the best or optimal O–D route, ignoring the presence of any TTRs for now. That is, a vehicle turn associated with a TTR is initially assumed to be available without restriction. Only non-lapsing turn restrictions ("NLTRs") and non-lapsing lane restrictions ("NLLRs") are included in the route planning and optimization process initially.

Steps 44, 45 and 46 are optional and are included only where the changing effects of adoption of daylight savings time ("DST") are important. In step 44, the system determines whether any portion of a chosen route will pass through a region (of a county, borough, province state, country or other geographically defined section) that recognizes DST? Within the U.S., all states except Arizona and Indiana recognize and have adopted use of DST, from 2:00 a.m. on the first Sunday in April until 2:00 a.m. on the last Sunday in October, referred to here as a "DST time interval." If the answer to the question in step 44 is "no," the system proceeds to step 47.

If the answer to the question in step 44 is "yes," the system proceeds to step 45 and inquires whether any part of the trip is likely to occur within a DST time interval? If the answer to the question in step 45 is "no," the system proceeds to step 47.

If the answer to the question in step 45 is "yes," the system proceeds to step 46 and adjusts the local time throughout the remainder of the procedure, as appropriate, to take account of the presence of DST during the time likely to be consumed by the trip. The system then proceeds to step 47. Steps 44, 45 and 46 can be inserted anywhere the system consults local time to determine if a TTR is likely to be present or active, for example, in any of steps 53, 55, 63 or 65 in FIGS. 6A and 6B.

Another time-dependent effect arises from what are characterized as time zone "offsets." Assume that a community is originally located in, and on the edge of, a first time zone TZ1, for example, the town of Garrison on the border between Utah (Mountain time zone) and Nevada (Pacific time zone). If a portion of this community subsequently spills over and develops in an adjacent, different time zone TZ2, the time zone TZ1 may be offset or expanded locally to include the spillover of this community so that the entire community lies within the first time zone TZ1. In step 47 the system determines whether any portion of a chosen trip route will pass within a threshold distance (e.g., within ten miles) of a time zone boundary? If the answer to the question in step 47 is "yes," the system passes to step 48 and determines if any portion of a chosen trip route will pass through a time zone offset region? If the answer to the question in step 48 is "yes," the system adjusts the local time within the time zone offset region to take account of this time offset, as appropriate, in step 49, and proceeds to step 51. If the answer to the question in step 47 is "no," or if the answer to the question in step 48 is "no," the system proceeds directly to step 51. Optionally, steps 47 and 48 can be collapsed into a single step that inquires (only) whether any portion of a chosen route will pass through a time zone offset region?

In step 51, the system determines the number (N) of TTRs in the (remainder of the) route; and if N≥1, the system consecutively numbers these TTRs n=1, . . . , N, where N is the maximum number of TTR locations on this route. A TTR number n has an associated time interval of effectiveness given by $$TTR(begin;n) \leq t \leq TTR(end;n)(n=1, \ldots, N), \quad (1)$$

during which a particular turn at the location corresponding to TTR number n is not permitted. This time interval of effectiveness for TTR number n given in Eq. (1) is assumed to be adjusted, as appropriate, for the effect of daylight saving time (DST) and/or for location of TTR number n in a time offset zone.

In step 53, the system examines the O–D route, or the remainder thereof, and inquires if the (remainder of the) route contains one or more TTRs? If the answer to the question in step 53 is "no," the system proceeds to step 65; the rest of the route planning procedure is straightforward, because no additional TTR is expected to be present for the remainder of the route.

If the answer to the question in step 53 is "yes," the system proceeds to step 55 and determines an estimated time of arrival, ETOA(n), of the vehicle at the turn location corresponding to TTR number n ("TTR location number n"), given that the trip begins at the specified time of departure TD. In step 57, the system determines the subset S' of TTR locations number n' (1≤n'≤N) for which the estimated time of arrival, ETOA(n'), of the vehicle at the TTR location number n' satisfies the relations $$TTR(begin;n')-\Delta t(buffer;1) \leq t \leq TTR(end;n')+\Delta t(buffer;2), \quad (2)$$

where $\Delta t(buffer;1)$ and $\Delta t(buffer;2)$ are two selected positive time increments that are included in order to provide a buffer or measure of safety around the time period of effectiveness for TTR number n', which may depend upon n'.

Each of these buffer time increments may be independently chosen in the range 60–300 sec, or greater if desired. The lower limit of this range may be an estimate of the amount of time a vehicle may require to change lanes when approaching a turn that is part of the O–D route. The upper limit of this range may be an estimate of the variation in the actual time of arrival that may occur, relative to the estimated time of arrival, ETOA(n), at the TTR location number n. Equation (2) defines a "buffered time interval of effectiveness" for the TTR location number n'. If this buffered time interval is (optionally) reduced to the "bare" time interval of effectiveness indicated in Eq. (1), by setting $\Delta t(buffer;1)$ and $\Delta t(buffer;2)$ equal to zero, this would provide no margin of safety for the vehicle when it arrives at the TTR location number n'. Optionally, the buffer time increments $\Delta t(buffer;1)$ and $\Delta t(buffer;2)$ may be independently chosen for each TTR location by the vehicle operator, either before the trip begins or enroute.

In step 59, the system inquires whether the subset S' is non-empty; that is, whether at least one TTR location number n exists for which Eq. (1) is satisfied? If the answer to the question in step 59 is "no," the system proceeds to step 65, and the rest of the route planning process is straightforward. If the answer to the question in step 59 is "yes," the system temporarily removes the non-empty subset S' of TTR locations, as potential turn locations, from the database being used to construct an optimum O–D route, to produce a modified database, in step 61. This modified database may be produced by forming a copy of the original database, then removing the set S' of TTR locations from the copy to produce a modified database, or by (optionally) tagging the TTR locations to be ignored in route calculations.

In step 63, the system computes or otherwise determines a new optimum O–D route, using the modified database, and recycles to step 51. In this recalculation of an optimum O–D route, restrictions on turns at TTR locations are again ignored, except that the time-restricted turns at the TTR locations in the set S' are not permitted. If the steps 51–61 are repeated, the subset S' of TTR locations should include all the TTR locations thus identified in any pass through step 57 for this route planning process. Optionally, the candidates for the new optimum O–D route can be drawn from the set of M "best" O–D routes determined and stored in step 42, or a candidate route can be identified and examined without regard to whether such a route is part of the originally-identified M "best" O–D routes.

Ultimately, a new optimal O–D route is identified that either (i) does not contain at least one TTR or (ii) contains one or more TTRs, but none of these TTRs satisfies Eq. (2). The system then passes from step 53 or from step 59 to step 65 (optional), where the ETOA for the destination D using the new optimal O–D route is calculated. In step 67 (optional), at least one of the new optimum O–D route and the ETOA at the destination D is displayed.

The steps 41–49, 51, 53, 55, 57, 59, 61, 63, 65 and/or 67 can be performed using a microprocessor, database and/or display positioned on a vehicle, such as the vehicle that will follow the optimum O–D route. Alternatively, part or all of these steps can be performed at a central station, and the chosen or optimum route thus determined can be transmitted to the vehicle for its subsequent use.

Figure 6B:
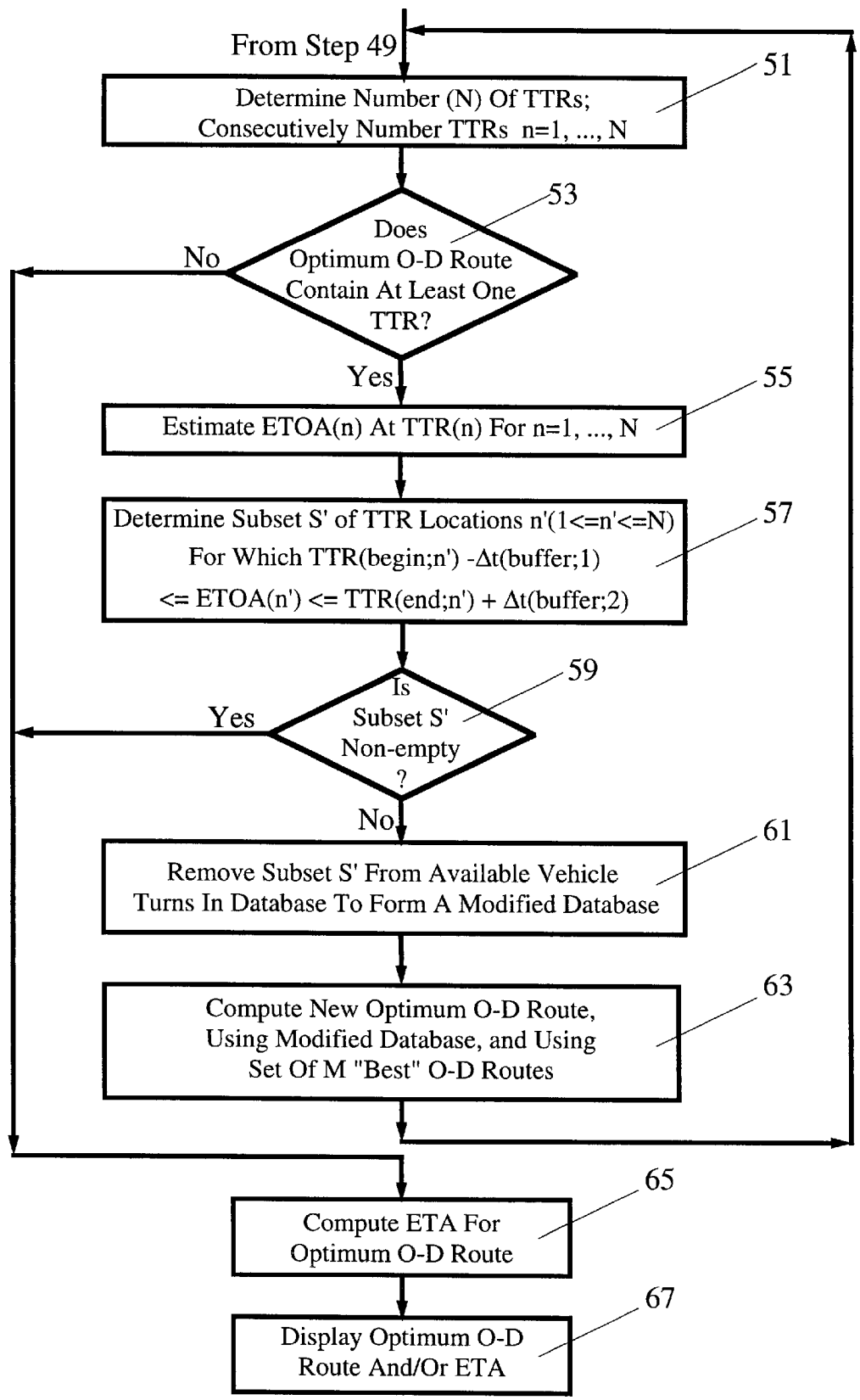
Figure 7A:
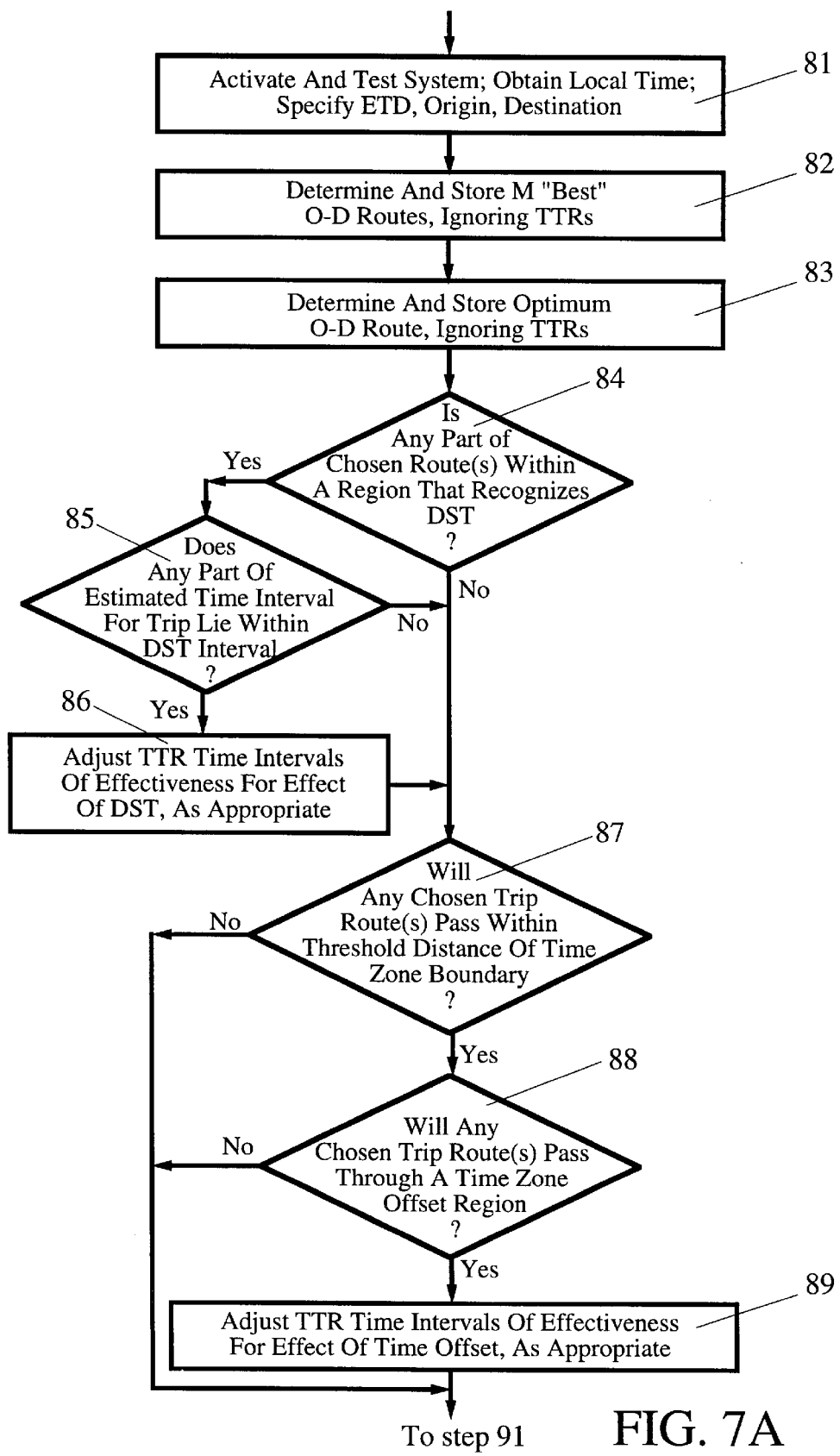
FIG. 7A/7B is a flow chart illustrating a route planning process that takes account of TTRs, according to another embodiment.

FIG. 7A/7B presents a flow chart of an embodiment of the invention for route planning, taking account of the presence of TTRs that is similar to that of FIGS. 6A and 6B, but that handles differently the task of optimum route recalculation in the presence of one or more TTRs that satisfy Eq. (2).

Steps 81, 82, 83, 84, 85, 86, 87, 88, 89, 91 and 93 are identical to the steps 41, 42, 43, 44, 45, 46, 47, 48, 49, 51 and 53, respectively, in FIGS. 6A and 6B. If the answer to the question in step 93 is "no," the system proceeds to step 105, and the remainder of the route planning process is straightforward.

If the answer to the question in step 93 is "yes," the system proceeds to step 95, where the system estimates the time of arrival, ETOA(n), of the vehicle at TTR location number n, given that the trip begins at the specified departure time TD. In step 97, the system inquires whether the estimated time of arrival, ETOA(n), satisfies Eq. (2), with n' replaced by n? If the answer to the question in step 97 is "no," the effect of TTR number n is ignored, and the system proceeds to step 101.

If the answer to the question in step 97 is "yes," the system recalculates the (remainder of the) optimum O–D route, where the turn at TTR location number n is temporarily deleted from the database, to produce a modified database, in step 99. Production and use of a modified database in step 99 is analogous to production and use of a modified database in step 61 in FIG. 6B. Optionally, the candidates for the new optimum O–D route can be drawn from the set of M "best" O–D routes determined and stored in step 82, or a candidate route can be identified and examined without regard to whether such a route is part of the originally-identified M "best" O–D routes.

The system then recycles to step 91, and steps 91, 93, 95 and 97 are repeated for the recalculated optimum O–D route. Each time these steps are repeated, at least one additional TTR location has been removed from the thus-modified database before a new optimum O–D route is calculated.

In step 101, the index n for the TTR locations is incremented (n→n+1). In step 103, the system inquires whether the (thus-incremented) index number n satisfies n≦N+1? This indicates whether all TTRs in this particular optimal O–D route have been examined and dealt with. If the answer to the question in step 103 is "no," the system recycles to step 95, and the steps 95 and 97 are repeated for the thus-incremented index number n.

If the answer to the question in step 103 is "yes," the system proceeds to step 105 (optional) and calculates the ETOA at the destination D for the presently-identified optimum O–D route. The system then proceeds to step 107 (optional) and displays at least one of the optimum O–D route and the corresponding ETA for the destination D.

The steps 81–89, 91, 93, 95, 97, 99, 101, 103, 105 and/or 107 can be performed using a microprocessor, database and/or display positioned on a vehicle, such as the vehicle that will follow the optimum O–D route. Alternatively, part or all of these steps can be performed at a central station, and the chosen or optimum route thus determined can be transmitted to the vehicle for its subsequent use.

Figure 8A:
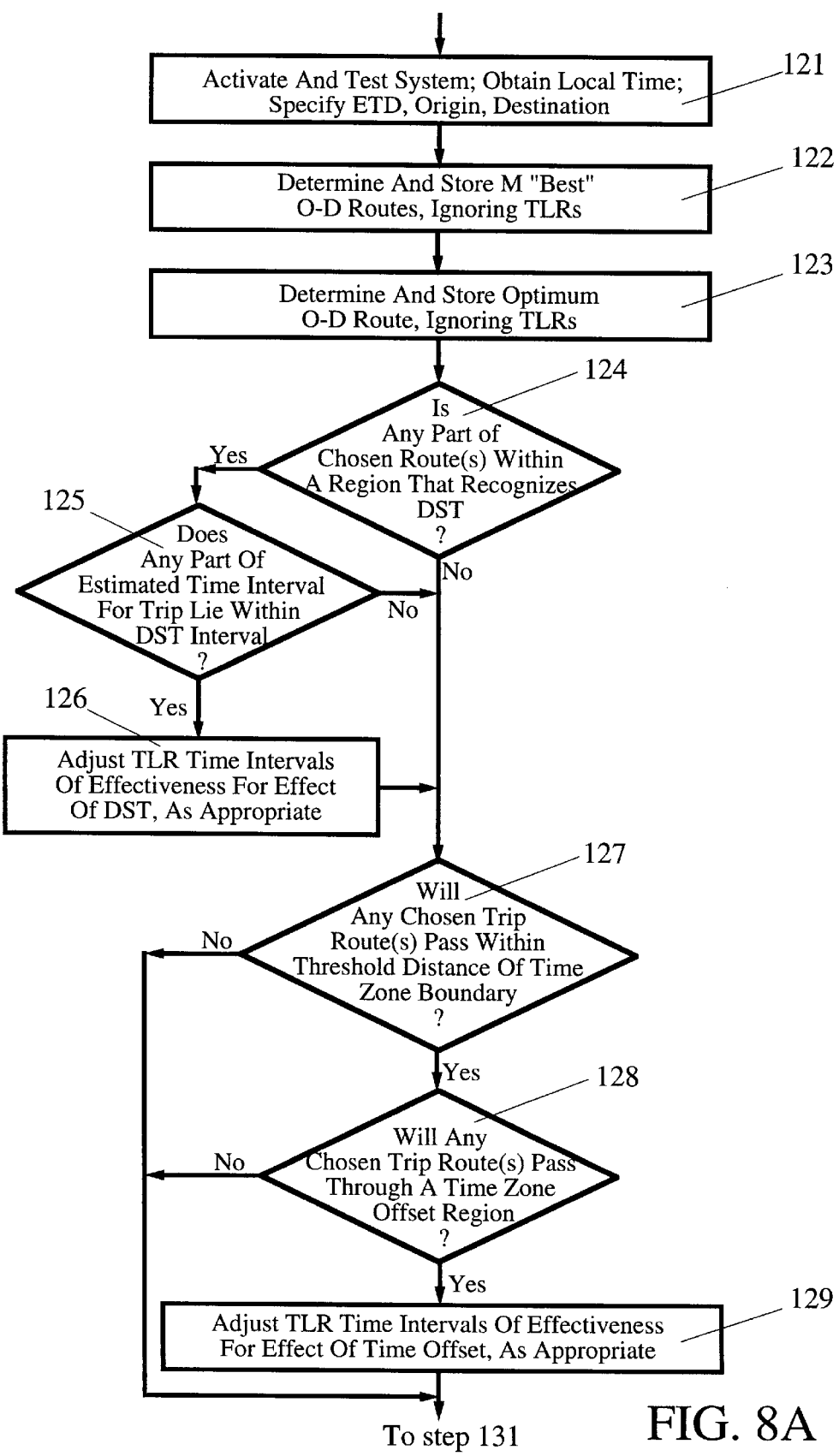
FIG. 8A/8B is a flow chart illustrating a route planning process that takes account of TLRs, according to one embodiment.
Figure 8B:
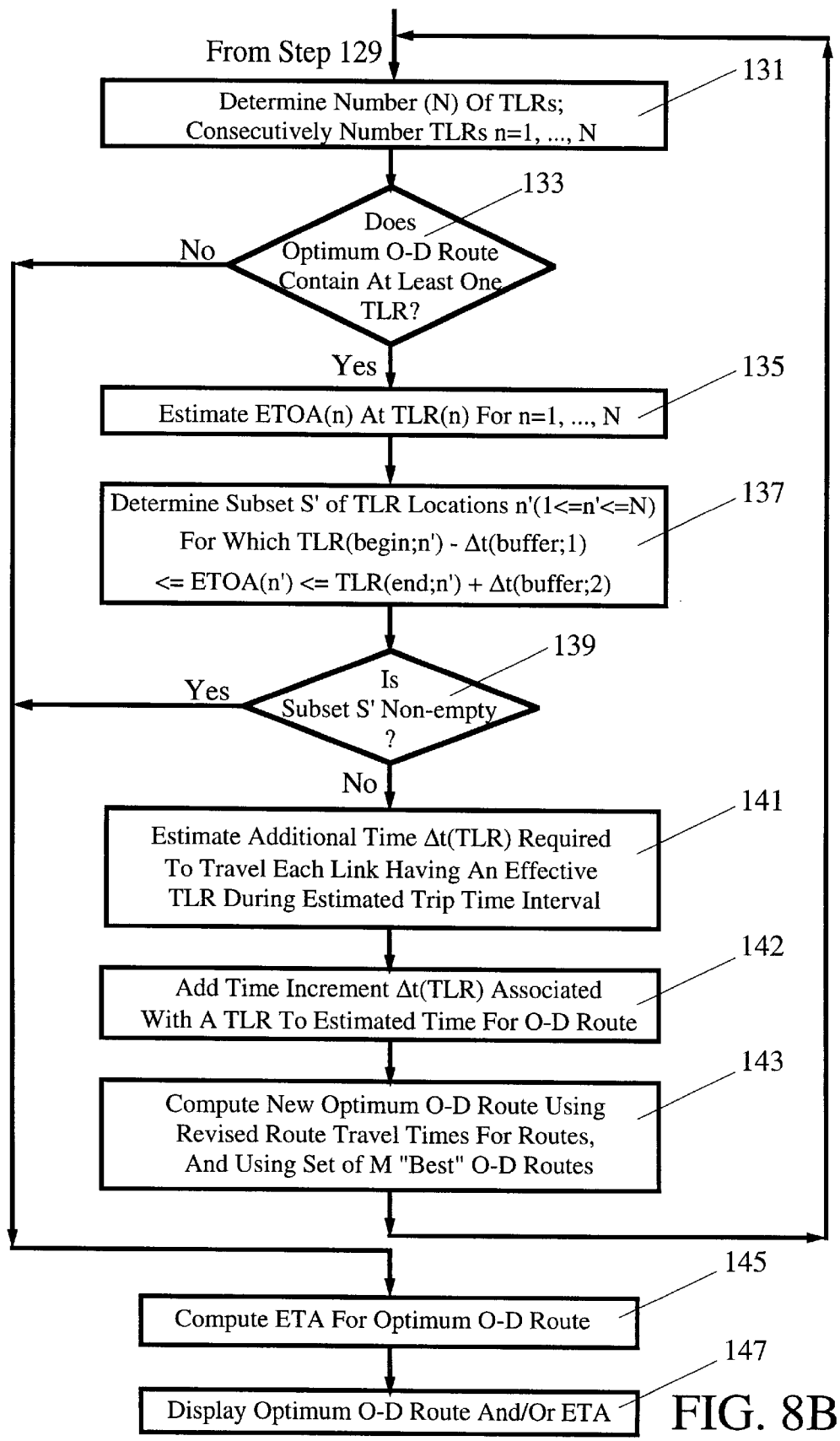

FIG. 8A/8B presents a flow chart of an embodiment of the invention for route planning that takes account of the presence of TLRs, similar to the route planning process for TTRs shown in FIGS. 6A and 6B. The steps 121, 122, 123, 124, 125, 126, 127, 128, 129, 131, 133, 135, 137, 139, 145 and 147 are analogous to the steps 41, 42, 43, 44, 45, 46, 47, 48, 49, 51, 53, 55, 57, 59, 65 and 67, respectively, in FIGS. 6A and 6B. In step 141 of FIG. 8B, the system estimates the additional time Δt(TLR), if any, required to travel along each link (part of the set S') for which a TLR is likely to be effective during the time of travel on that link. In Step 142, the system adds the time increment Δt(TLR) associated with each such TLR (optionally dependent on link number n) to the time computed for that O–D route. The buffered time interval of effectiveness for a TLR number n is given by $$TLR(begin;n)-\Delta t(buffer;1) \leq t \leq TLR(end;n)+\Delta t(buffer;2), \quad (3)$$

which is analogous to Eq. (2) for a TTR.

In step 143, the system computes a new optimum O–D route, using revised route travel times in which the estimated time increments Δt(TLR) associated with each link with an effective TLR are included, and returns to step 131. Optionally, the candidates for the new optimum O–D route can be drawn from the set of M "best" O–D routes determined and stored in step 122, or a candidate route can be identified and examined without regard to whether such a route is part of the originally-identified M "best" O–D routes.

In the process illustrated in FIG. 8A/8B, when a lane is removed from a link in the network of links in the database in step 141, because of the presence of an effective TLR, this lane removal will usually not require removal of the entire link corresponding to the TLR. This lane removal will usually merely reduce the number of, or otherwise alter the, lanes available for traffic on that link in the direction associated with an optimum O–D route, thus making this route less attractive from a "cost" perspective.

The steps 121–129, 131, 133, 135, 137, 139, 141, 142, 143, 145 and/or 147 can be performed using a microprocessor, database and/or display positioned on a vehicle, such as the vehicle that will follow the optimum O–D route. Alternatively, part or all of these steps can be performed at a central station, and the chosen or optimum route thus determined can be transmitted to the vehicle for its subsequent use.

Figure 7B:
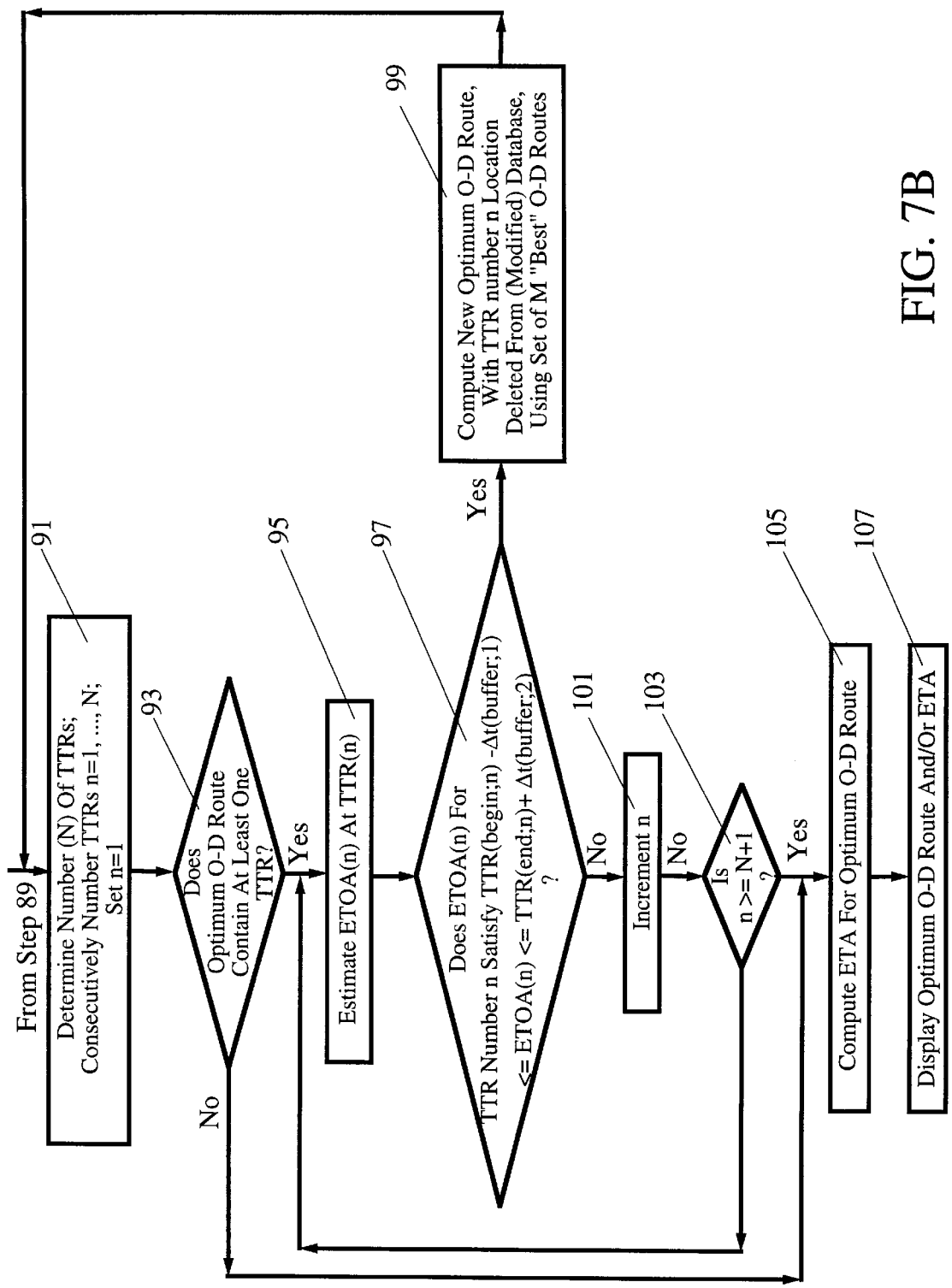
Figure 9A:
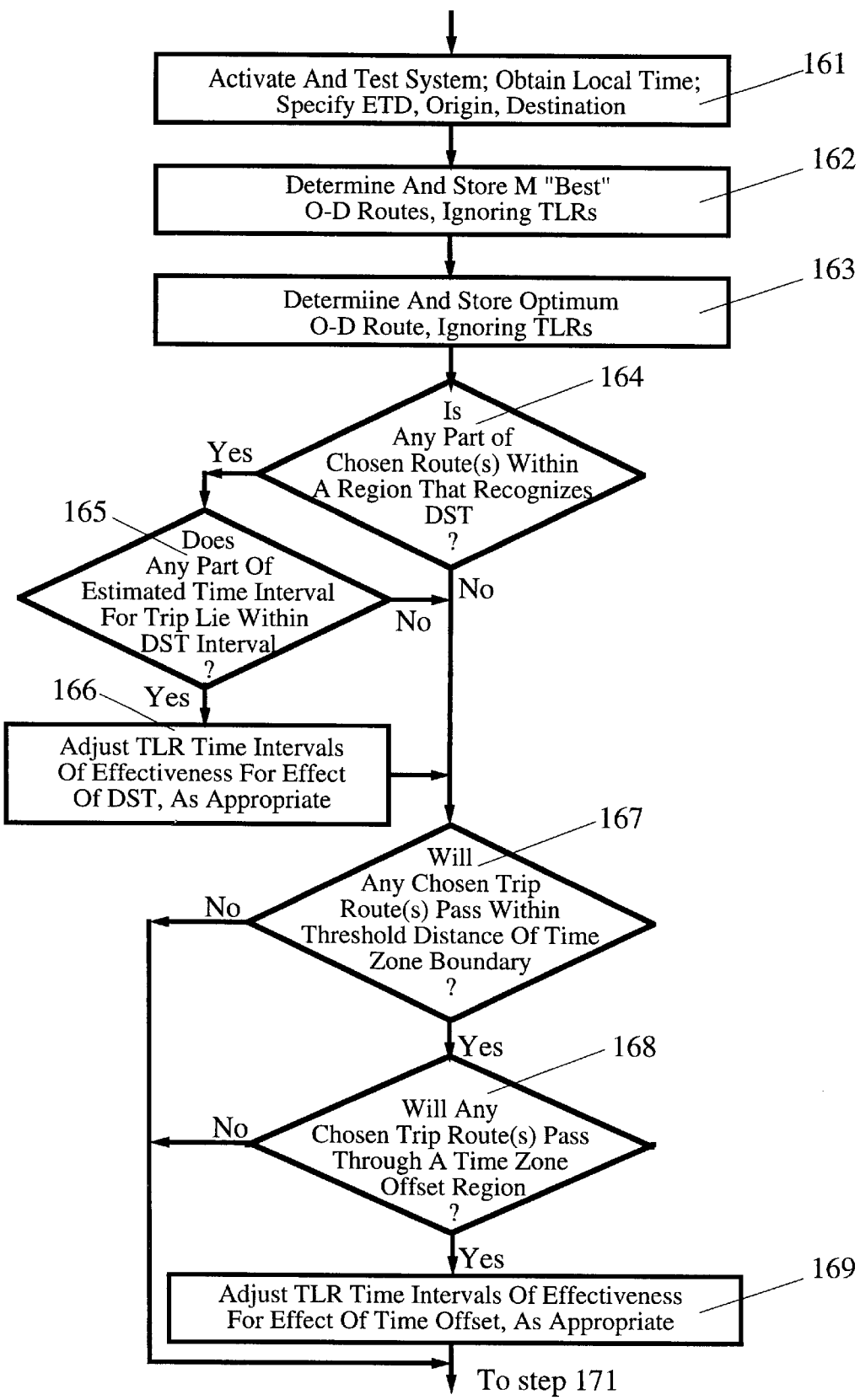
FIG. 9A/9B is a flow chart illustrating a route planning process that takes account of TLRs, according to another embodiment.
Figure 9B:
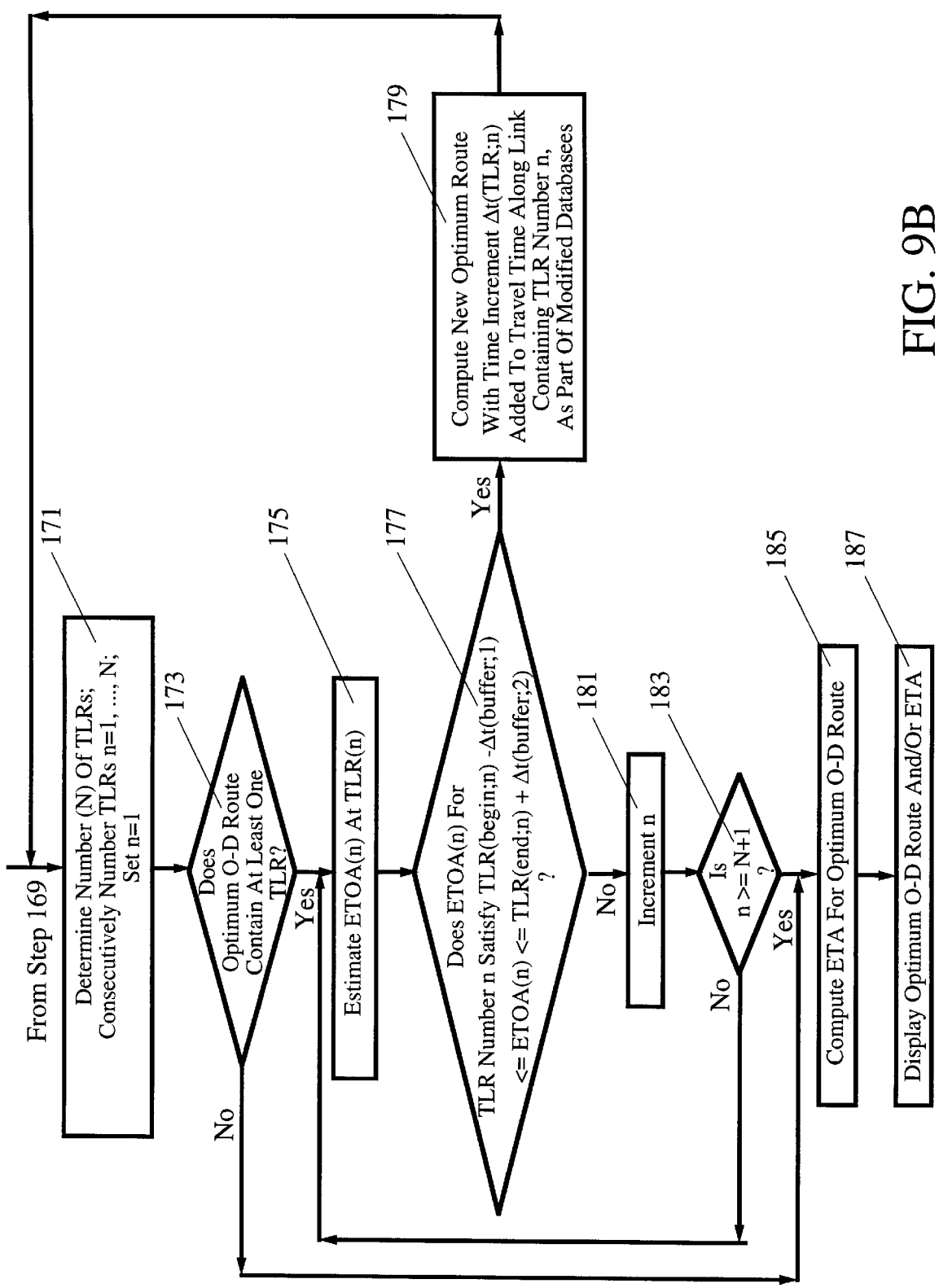

FIG. 9A/9B presents a flow chart of a second embodiment of the invention for route planning that takes account of the presence of TLRs, similar to the process for TTRs shown in FIGS. 7A and 7B. The steps 161, 162, 163, 164, 165, 166, 167, 169, 171, 173, 175, 177, 181, 183, 185 and 187 are analogous to the steps 81, 82, 83, 84, 85, 86, 87, 89, 91, 93, 95, 97, 101, 103, 105 and 107, respectively, in FIGS. 7A and 7B.

In step 179 in FIG. 9A/9B, the system computes or otherwise determines a new optimum route, by estimating and including the additional time Δt(TLR;n), in any, required to travel along the link for which TLR number n is likely to be effective during the time of travel on a link that is part of the candidate O–D route However, the system does not eliminate this link from the O–D route unless no lane is available for travel in the route direction with TLR number n imposed. Optionally, the candidates for the new optimum O–D route in step 179 can be drawn from the set of M "best" O–D routes determined and stored in step 162, or a candidate route can be identified and examined without regard to whether such a route is part of the originally-identified M "best" O–D routes.

The steps 161–169, 171, 173, 175, 177, 179, 181, 183, 185 and/or 187 can be performed using a microprocessor, database and/or display positioned on a vehicle, such as the vehicle that will follow the optimum O–D route. Alternatively, part or all of these steps can be performed at a central station, and the chosen or optimum route thus determined can be transmitted to the vehicle for its subsequent use.

Where a vehicle approaches a turn (a node) or a link that is part of an optimum O–D route and that has a TTR or TLR associated with that turn or link, the vehicle operator is preferably advised of the presence of this TTR or TLR and of the time interval of effectiveness for this restriction, using a visual and/or audible display. Optionally, the present local time can also be displayed for the vehicle operator.

If this restriction arises from a TTR, a turn affected by that TTR may be highlighted on the display, as an arrow in a first color or fill texture (e.g., solid green with no fill texture) if the turn is presently permitted based on the local time, and as a cross-hatched arrow or other suitable icon in a second distinguishable color or fill texture (e.g., red with a striped fill texture) if the turn is presently prohibited based on the local time. The presence of the TTR may be determined and indicated, using an unbuffered time interval of effectiveness, as in Eq. (1), or using a buffered time interval of effectiveness, as in Eq. (2).

If the restriction arises from a TLR, a link with a lane affected by the TLR may be highlighted in a similar manner. Presence of a TLR, which restricts use of one or more lanes that are part of a link, is usually less restrictive than presence of a TTR. Preferably, when the vehicle approaches within a selected distance, such as one kilometer or one mile, of the location of a turn node or link with an associated TVR, a highlighted display is automatically presented, consistent with display of any other nearby TVR that is also part of the optimum O–D route.

Figure 10A:
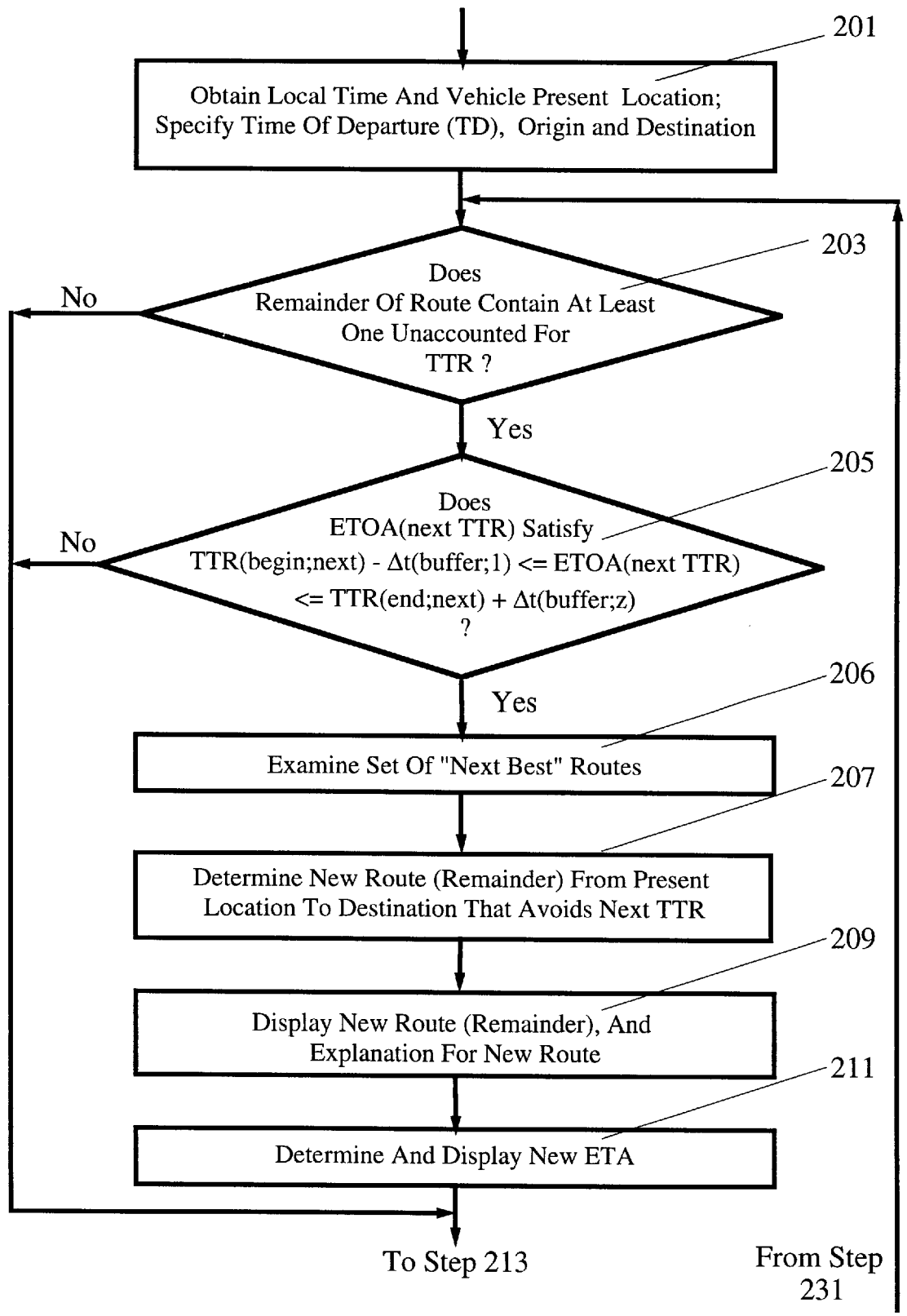
FIG. 10A/10B/10C is a flow chart illustrating a re-routing process that takes place enroute and that takes account of TTRs and TLRs, according to one embodiment.
Figure 10B:
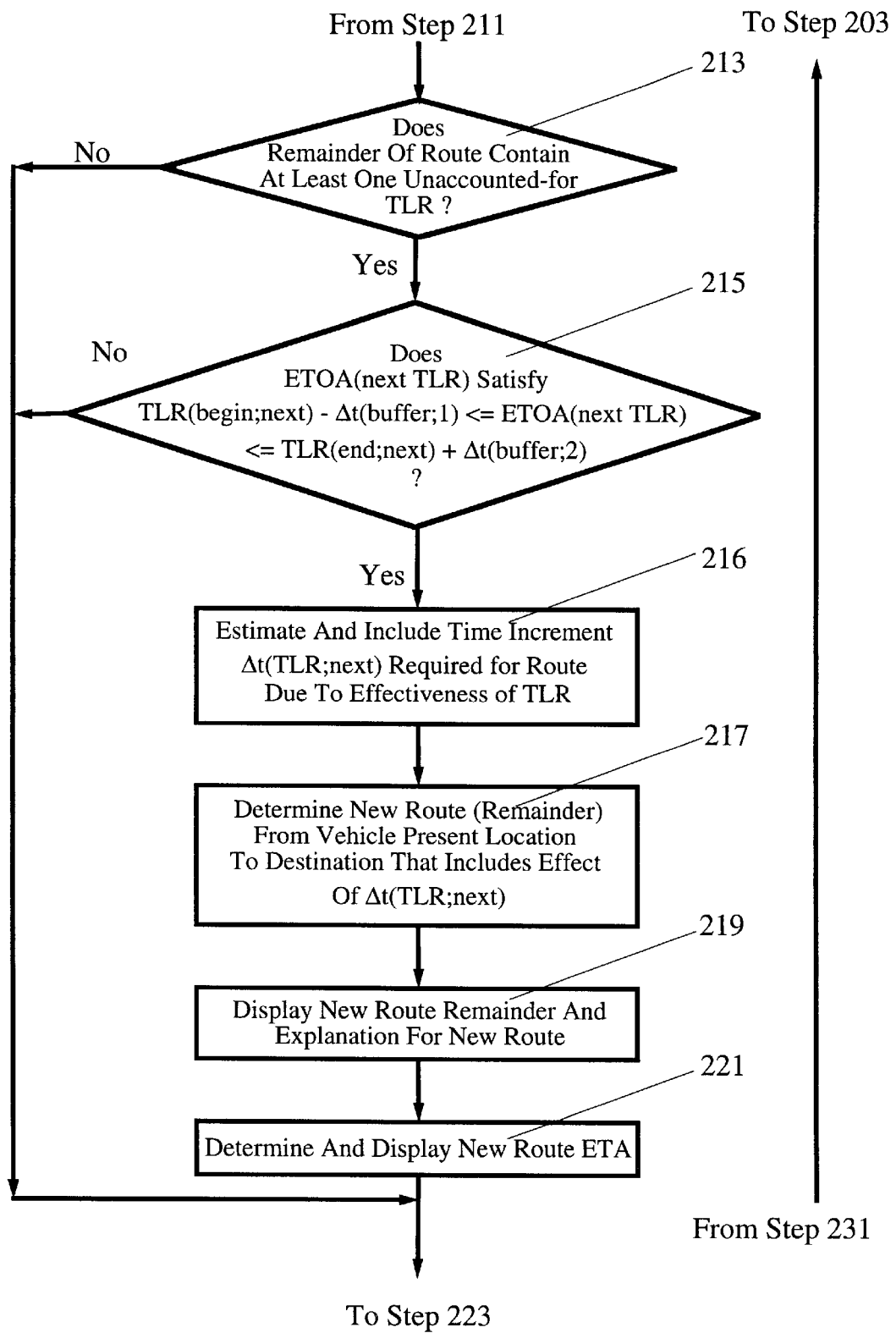
Figure 10C:
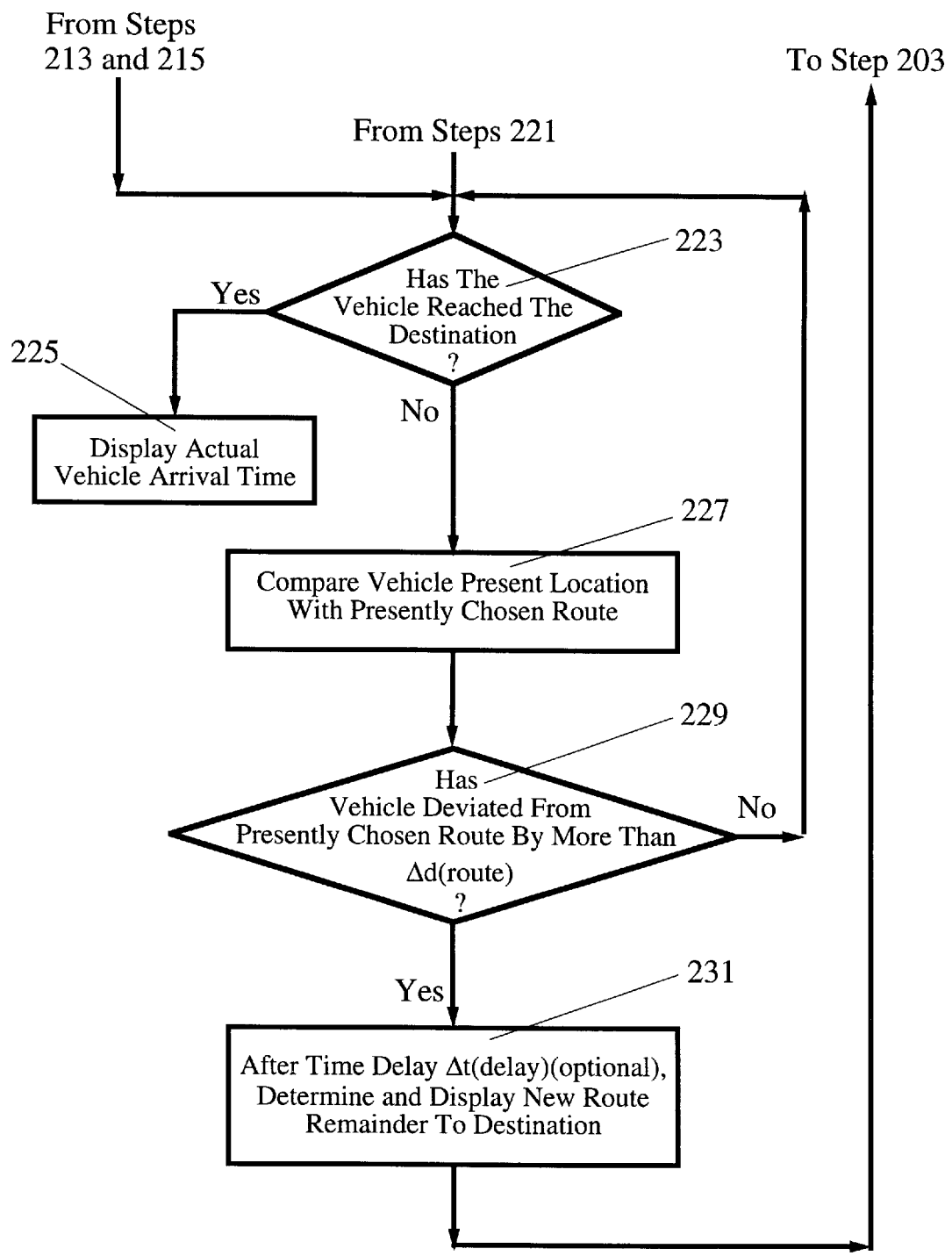

FIG. 10A/10B presents a flow chart of an embodiment of the invention to be used when the vehicle is departing from the origin O or is already enroute. Preferably, the system on the vehicle includes a position determination unit (PDU) that receives signals and determines the present location of the vehicle so that a new route can be determined, from the vehicle's present location to the destination D, in response to unexpected developments that are met enroute.

The local time, vehicle present location, actual time of departure and destination D are assumed to be known or determined, in step 201. In step 203, the system inquires whether the remainder of the route, viewed from the vehicle present location, contains at least one effective TTR? If the answer to the question in step 203 is "no," the system proceeds to step 213.

If the answer to the question in step 203 is "yes," the system determines, in step 205, whether the vehicle ETOA (next TTR) at the next effective TTR that will be encountered on the remainder of the present route is within a buffered time interval of effectiveness of this next TTR? That is, does ETOA(next TTR) satisfy $$TLR(\text{begin;next TTR})-\Delta t(\text{buffer};1) \leq ETOA(\text{next TTR}) \leq TTR(\text{end;next TTR})+\Delta t(\text{buffer};2)? \quad (4)$$

Although the original optimum route planning process purported to remove from the optimum O–D route any TTR satisfying Eq. (4) (or Eq. (2)), the actual time of departure TD may differ significantly from the estimated time of departure ETD used in the initial route planning process; or the actual O–D route used may differ from the initial optimum O–D route identified because of another constraint that is introduced after the initial optimum O–D route is determined. If the answer to the question in step 205 is "no," the system proceeds to step 213.

If the answer to the question in step 205 is "yes," the system optionally examines the M initial "best" routes that were optionally determined and stored in step 42 of FIG. 6A (or in step 82 of FIG. 7A), in step 206, as candidates for a new (optimum) remainder route, beginning at the vehicle present location and ending at the selected destination D.

In step 207, the system determines a new route remainder, which is preferably but not necessarily optimum, from the present vehicle location to the destination D that avoids the next TTR satisfying Eq. (2). If the system does not include a PDU, the vehicle operator will have to determine the vehicle present location in another manner and enter the vehicle present location into the system, whenever the system requires it. In step 209, the system optionally displays the new remainder optimum route the system has calculated and optionally displays an explanation for determining and presenting the new remainder optimum route. This might occur because the vehicle left the origin at a time that differs substantially from the originally specified time of departure (TD), or because the vehicle has experienced one or more substantial time delays or other time deviations enroute that were not taken account of in the original optimum route determination. In step 211, the system optionally determines and displays a new estimated time of arrival ETOA for the vehicle at the destination D. The system then recycles to step 203.

In step 213, the system inquires whether the remainder of the route, viewed from the vehicle present location, contains at least one TLR, not accounted for in the determination of the present chosen route? If the answer to the question in step 213 is "no," the system proceeds to step 223.

If the answer to the question in step 213 is "yes," the system determines, in step 215, whether the vehicle ETOA (next TLR) at the next TLR that will be encountered on the remainder of the present route is within a buffered time interval of effectiveness of this next TLR? That is, does ETOA(next TLR) satisfy $$TLR(\text{begin;next TLR})-\Delta t(\text{buffer};1) \leq ETOA(\text{next TLR}) \leq TLR(\text{end;next TLR})+\Delta t(\text{buffer};2)? \quad (5)$$

If the answer to the question in step 215 is "no," the system proceeds to step 223.

If the answer to the question in step 215 is "yes," the system estimates and includes a time increment $\Delta t(TLR;\text{next})$, if any, required to travel along the remainder of the presently chosen O–D route due to the effectiveness of this next TLR, in step 216. Optionally, in step 216, the system examines the list of M "best" routes the system has (optionally) calculated and stored in step 122 of FIG. 8A (or in step 162 of FIG. 9A), in calculating a new optimum route from the present vehicle location to the destination D. In step 217, the system determines a new route remainder, which is preferably but not necessarily optimum, from the present vehicle location to the destination D. Determination of this route remainder includes the effect of inclusion of the time increment $\Delta t(TLR;\text{next})$ for the next TLR (satisfying Eq. (4)) for the presently chosen O–D route. If the system does not include a PDU, the vehicle operator will have to determine the present location of the vehicle and enter this information into the system.

In step 219, the system optionally displays the new (remainder of the) optimum route the system has calculated and optionally displays an explanation for determining the new (remainder of the) optimum route. This might occur because the vehicle left the origin at a time that differs substantially from the originally specified time of departure (TD), or because the vehicle has experienced one or more substantial time delays or other time deviations enroute that were not taken account of in the original optimum route determination. In step 221, the system optionally determines and displays a new estimated time of arrival ETOA for the vehicle at the destination D. The system then proceeds to step 223.

One of the sequences of steps {203, 205, 206, 207, 209, 211} and {213. 215, 216, 217, 219, 221} can be deleted, if desired, if only the TTRs, or only the TLRs, are of concern enroute.

In step 223, which is reached from step 203 or from step 205 (indirectly) or from step 213 or from step 215, the system determines whether the vehicle has reached its destination? This may be determined by comparing the vehicle present location with the destination location D. If the distance between these two locations is less than a selected threshold distance $d_{thr}$, such as 20–100 meters, the answer to the question in step 223 is "yes," and the system optionally displays the actual vehicle arrival time, in step 225.

If the answer to the question in step 223 is "no," the system continues to track the vehicle present location and to compare this location with the route, or route remainder, that is assumed to be followed, in step 227. In step 229, the system determines if the vehicle has deviated by at least a threshold amount $\Delta d_{route,thr}$ (e.g., 50–200 meters) from the assumed route. If the answer to the question in step 229 is "no," the system recycles to step 223.

If the answer to the question in step 229 is "yes," the system concludes that the vehicle is intentionally deviating from the assumed route, and the system proceeds to step 231. In step 231, after an optional time delay $\Delta t(\text{delay})$ of the order of 30–120 sec, the system determines and optionally displays a new route remainder from the vehicle present location to the destination D. Preferably, but not necessarily, this new route remainder will be optimal among all routes that begin at the vehicle present location and end at the destination D. The system optionally examines the M "best" O–D routes found and stored in steps 42, 82, 122 and/or 162 of FIGS. 6A, 7A, 8A and/or 9A, in performing the tasks in step 231. The system then recycles to step 203. Most likely, the vehicle will ultimately reach the destination D, the system will answer "yes" in step 223, and the process will end at step 225.

The question in step 229 may be answered "yes" because the vehicle has encountered an unanticipated vehicle barrier (UVB) along the presently chosen route. A UVB may arise from a traffic accident or other event involving one or more other vehicles or structures that obstructs passage by the target vehicle (21 in FIG. 1) along the O–D route presently being followed. This obstruction may be temporary, but the vehicle operator may prefer to treat the obstruction as "permanent" for purposes of this vehicle trip. A UVB may also arise from presence and effectiveness of a TTR or TLR whose existence was not anticipated when the present route was originally determined: a new TTR or TLR may be imposed at this location, or the time interval of effectiveness (Eq. (1)) of an extant TTR or TLR may have been changed. Poelstra, in U.S. Pat. No. 4,994,971, discloses a system for establishing and maintaining up-to-date data files for road traffic and road conditions.

In determining an optimal route or a feasible route from the present location of the vehicle (at the origin O or enroute), the system may perform an "incremental" route calculation. In this approach, the system identifies and displays a first portion, perhaps the first 500–2000 meters, of what is believed to be an optimal or feasible route so that the vehicle operator can begin the trip (or continue to move) in a given direction. As the vehicle moves through this first portion of the route, the system uses the intervening time to identify and display the remainder of an optimal or feasible route that is consistent with the portion of the route already traveled.

Figure 11:
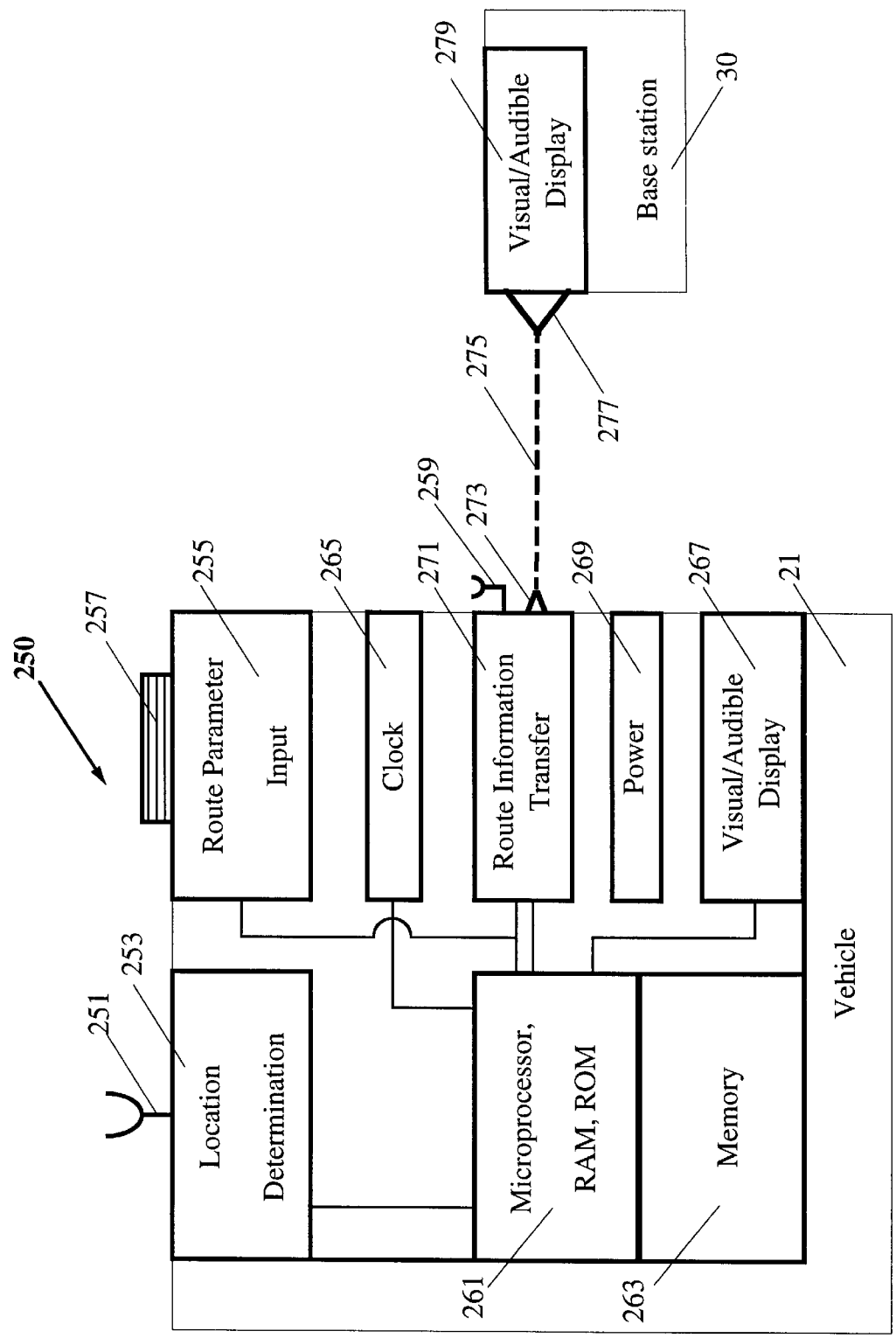
FIGS. 11 and 12 illustrate apparatus for practicing the invention.

FIG. 11 illustrates an embodiment of apparatus 250 that can be used to practice the invention. The apparatus 250 includes an antenna 251 that receives location determination (LD) signals from an LD signal source and passes these signals to an LD receiver/processor 253 that estimates or determines the present location of the antenna 251 (or of the apparatus 250) from the LD signals. If the apparatus 250 is used only for initial optimization and planning of a vehicle route, the LD signal antenna 251 and the LD signal receiver/processor 253 may be deleted. The apparatus 250 also includes a route parameter input device or interface 255 that receives vehicle route specifications, including route origin, route destination, estimated time of departure and specified roads to be avoided, if any, through a keyboard or other route parameter entry mechanism 257 (optional). Alternatively, route parameters are determined elsewhere and are transmitted for reception at a route parameter antenna 259 (optional) that is part of the apparatus.

The received route parameters are sent to a microprocessor 261 and associated memory 263, where a route optimization programmed is stored and applied according to the invention. If enroute calculations of an optimum vehicle route are required, the microprocessor 261 also receives present location information from the LD signal receiver/processor 253 and receives present time information from a clock 265 (optional) that may be part of the microprocessor.

Optionally, the LD signal receiver/processor 253, if present, may be incorporated in the microprocessor 261. The microprocessor 261 is programmed to determine an optimal route, or an optimal route remainder, according to one or more of the embodiments of the invention that are illustrated by way of examples in FIGS. 6A/6B, 7A/7B, 8A/8B, 9A/9B and 10A/10B.

The apparatus 250 optionally includes a visual display (e.g., a computer screen or monitor) or audible display (e.g., a loudspeaker) 267 that is controlled by signals received from the microprocessor 261, for visually or audibly displaying any or all of the following information: (1) present time and/or date; (2) present location of the apparatus 250, displayed by alphanumerical coordinates, by street or road address, or by graphical display of the apparatus present location on an electronic map on a screen; (3) route data received for route planning purposes; (4) optimized route or route remainder, displayed by alphanumerical description of the route segments or links to be used and the order of use of the links, or by graphical display of the optimal route or a relevant portion of the optimal route. A power supply 269 supplies electrical power to one or more of the other components 251, 253, 255, 257, 259, 261, 263, 265 and 267 of the apparatus 250.

Figure 12:
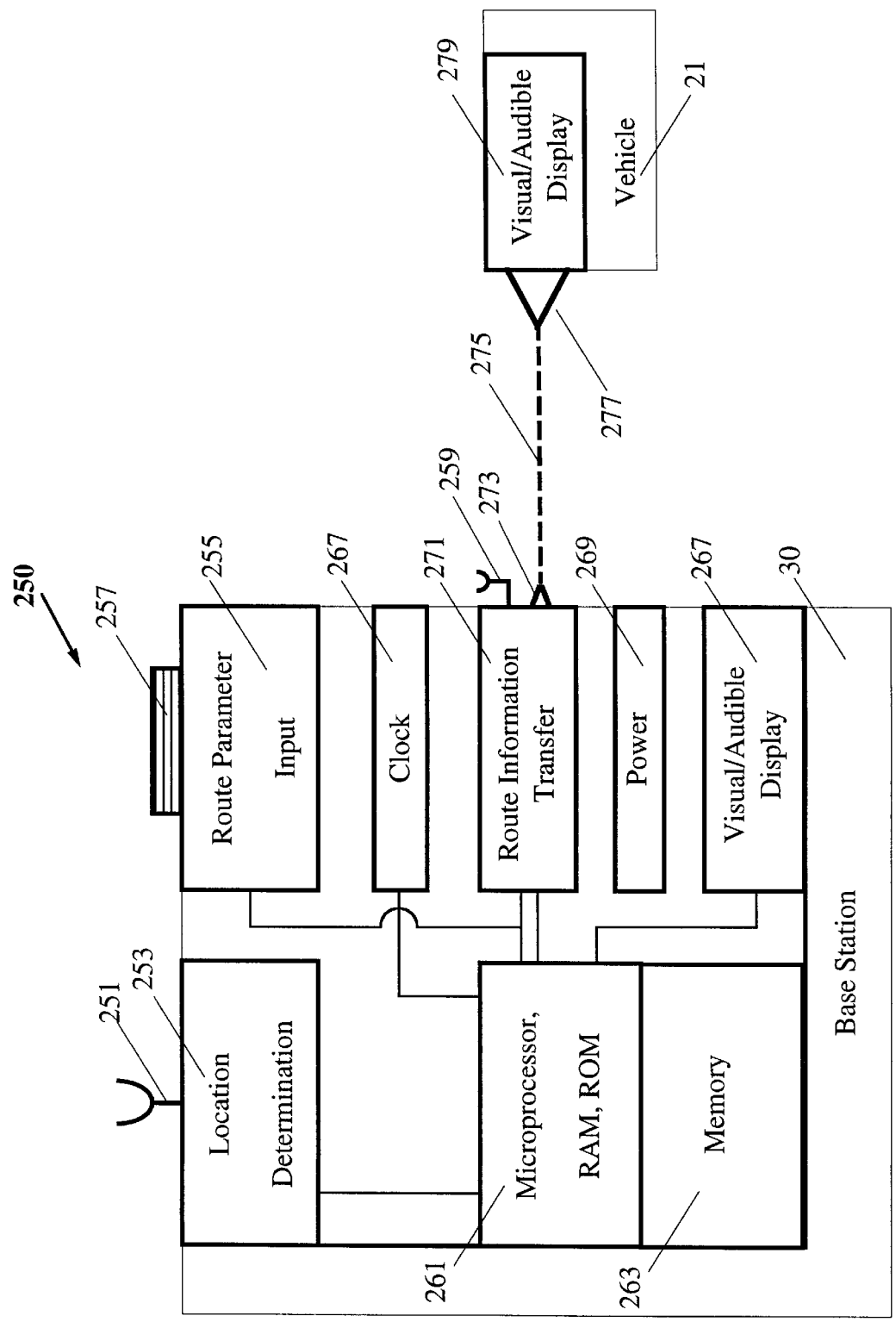

The apparatus 250 may be attached to and carried on the vehicle 11 or may be portable apparatus that may be placed in or on the vehicle and used by an operator of the vehicle, as illustrated in FIG. 11. Alternatively, as illustrated in FIG. 12, the apparatus 250, including the route parameter input device 255, the microprocessor 261 and associated memory 263, may be located at a base station 30 (also shown in FIG. 1) that is spaced apart from the vehicle 21 (FIG. 1). In this alternative embodiment, the apparatus 250 is provided with a route information transfer module or interface 271 and with a first data transfer mechanism 273 for transferring information on a selected route to a vehicle display 279 that is carried on or in the vehicle. The first data transfer port 273 is connected through a data transfer channel 275 to a second data transfer mechanism 277, which is carried on or in the vehicle and is electrically connected to the display unit 279, as shown in FIG. 11. The data transfer channel 275 may be a cable or wire that connects the first and second data transfer mechanisms 273 and 277. Preferably, however, the data transfer channel 275 is a wireless radio channel, and the first and second data mechanisms 273 and 277 are first and second antennas suitable for respectively transmitting and receiving data by radio wave signals. In this alternative embodiment, a route or optimum route is determined at the base station 30, based upon the selected route origin, route destination and estimated time of departure on the route, and the route information is transferred to the vehicle display unit 279 for viewing and use by a vehicle operator. In this alternative embodiment, the LD antenna 251 and the LD receiver/processor 253 are deleted and the display 267 located at the base station 30 is optional and may be deleted.

We claim:

1. A method for determining a route of travel for a vehicle, the method comprising the steps of:
   (1) using a computer database to determine a vehicle route from a selected trip origin at a selected time of departure to a selected trip destination;
   (2) when the route has no node with an associated timed turn restriction, denoted "TTR," proceeding to step (6);
   (3) when at least one node on the route has an associated TTR, denoted a "TTR node," estimating a time of arrival, denoted "ETOA," of the vehicle at at least one TTR node on the route;

(4) determining if the ETOA for at least one TTR node on the route lies in a buffered time interval of effectiveness, and when no ETOA for any TTR node on the route lies in the buffered time interval of effectiveness of the TTR for the TTR node, proceeding to step (6);

(5) when the ETOA for at least one TTR node on the route lies in the buffered time interval of effectiveness of the TTR for the at least one TTR node, redetermining a route for which a turn at the TTR node is not permitted and returning to step (2); and (6) displaying, in at least one of visually perceptible form and audibly perceptible form, at least one of (i) at least a portion of the determined route; (ii) at least a portion of the redetermined route; (iii) an estimated time of arrival of the vehicle at the selected destination for the determined route; and (iv) n estimated time of arrival of the vehicle at the selected destination for the redetermined route.

2. The method of claim 1, wherein said step (5) comprises the steps of:

(5A) when said ETOA for said at least one TTR node on said determined route lies in said buffered time interval of effectiveness of said TTR for said at least one TTR node, forming a modified database from the database, in which a turn at said at least one TTR node is not permitted;

(5B) using the modified database to redetermine a vehicle route from said selected trip origin at said selected time of departure to said selected trip destination; and (5C) replacing said determined route, used to determine whether said ETOA for at least one TTR node on said determined route lies in said buffered time interval of effectiveness of said TTR for said at least one TTR node in step (5A), by said redetermined route, and returning to step (2).

3. The method of claim 1, wherein said step (3) comprises the steps of:

(3') when said at least one TTR node on the route has an associated TTR, consecutively numbering each of the TTR nodes on said route as n=1, ... N, and estimating a time of arrival, denoted "ETOA(n)," of said vehicle at TTR node number n, where N is the total number of the TTR nodes present on said route.

4. A method for determining a route of travel for a vehicle, the method comprising the steps of:

(1) using a computer database to determine a vehicle route from a selected trip origin at a selected time of departure to a selected trip destination;

(2) when the route has no node with an associated timed turn restriction, denoted "TTR," proceeding to step (6);

(3) when at least one TTR node on the route has an associated TTR, consecutively numbering each said TTR node on said route as n=1, ..., N, and estimating a time of arrival, denoted "ETOA(n)," of said vehicle at TTR node number n, where N is the total number of the TTR nodes present on said route;

(4) forming a set S' of said TTR nodes on said route for which an estimated time of arrival ETOA(n') at a TTR node number n' satisfies the relation TTR(begin;n')−Δt(buffer;1)≦ETOA(n')≦TTR(end;n')+Δt(buffer;2), where n' is an integer lying between 1 and N, TTR(begin;n') and TTR(end;n') are the times at which the TTR number n' begins and ends at the TTR node number n', respectively, and Δt(buffer;1) and Δt(buffer;2) are selected positive time values, and when the set S' is empty, proceeding to said step (6);

(5) when the ETOA for at least one TTR node on the route lies in the buffered time interval of effectiveness of the TTR for the at least one TTR node, redetermining a route for which a turn at the TTR node is not permitted and returning to step (2); and (6) displaying, in at least one of visually perceptible form and audibly perceptible form, at least one of (i) at least a portion of the determined route, (ii) at least a portion of the redetermined route, (iii) an estimated time of arrival of the vehicle at the selected destination for the determined route, and (iv) an estimated time of arrival of the vehicle at the selected destination for the redetermined route.

5. The method of claim 4, wherein said step (5) comprises the step of:

(5') when said set S' is not empty, forming a modified database from the database in which a turn at any TTR node in said set S' is not permitted.

6. The method of claim 4, further comprising the step of selecting at least one of said time values Δt(buffer;1) and Δt(buffer;2) to be between 30 and 300 sec.

7. The method of claim 4, further comprising the steps of:

(7) determining whether any portion of said determined vehicle route lies in a region that has adopted daylight savings time;

(8) when no portion of said determined vehicle route lies in a region R that has adopted the daylight savings time, making no change in said ETOA at any TTR node, and making no change in said buffered time interval of effectiveness for any TTR node, on said determined vehicle route that reflects applicability of the daylight savings time;

(9) when a portion of said determined vehicle route lies in a region R that has adopted the daylight savings time but no TTR node on said determined vehicle route lies in the region R, making no change in said ETOA, and making no change in said buffered time interval of effectiveness for any TTR node, on said determined vehicle route that reflects applicability of the daylight savings time; and

(10) when at least one TTR node on said determined vehicle route lies in the region R that has adopted the daylight savings time, adjusting at least one of said buffered time interval of effectiveness for the TTR node and said ETOA at the TTR node to reflect the applicability of the daylight savings time at that node.

8. The method of claim 4, further comprising the steps of:

(7) determining whether said determined vehicle route will pass through any region that is part of a time zone offset;

(8) when said determined vehicle route will not pass through any region R that is part of the time zone offset, making no change in said buffered time interval of effectiveness of any TTR node, and making no change in said ETOA at a TTR node, on said determined vehicle route that reflects applicability of the time offset;

(9) when said determined vehicle route passes through a region R that is part of the time zone offset but no TTR node on said determined vehicle route lies in the region R, making no change in said buffered time interval of effectiveness of any TTR node, and making no change in said ETOA at a TTR node, that reflects applicability of the time offset; and

(10) when at least one node with an associated TTR on said determined vehicle route lies in the region R that is part of the time zone offset, adjusting at least one of said buffered time interval of effectiveness for the associated TTR and said ETOA at the TTR node with the associated TTR to reflect the applicability of the time offset at that node.

9. The method of claim 4, further comprising the step of performing at least one of said steps (1), (2), (3), (4), (5) and (6) at a station that is spaced apart from and that communicates with said vehicle.

10. The method of claim 4, further comprising the step of performing at least one of said steps (1), (2), (3) (4), (5) and (6) at said vehicle.

11. A method for determining a route of travel for a vehicle, the method comprising the steps of:

(1) using a computer database to determine a vehicle route from a selected trip origin at a selected time of departure to a selected trip destination;

(2) when the route has no node with an associated timed turn restriction, denoted "TTR," is present, proceeding to step (9);

(3) when at least one node on the route has an associated TTR, denoted a "TTR node," consecutively numbering the TTR nodes as n=1, . . . N, where N is the total number of TTR nodes present on the route;

(4) for at least one integer n ($1 \leq n \leq N$), estimating a time of arrival, denoted "ETOA(n)," of the vehicle at TTR node number n;

(5) determining if ETOA(n) satisfies the relation TTR(begin;n)$-\Delta$t(buffer;1)$-\Delta$t(buffer;1)$\leq$ETOA(n)$\leq$TTR(end;n)$+\Delta$t(buffer;2), where TTR(begin;n) and TTR(end;n) are the times at which the TTR begins and ends at TTR node n, respectively, and $\Delta$t(buffer;1) and $\Delta$t(buffer;2) are selected non-negative time values;

(6) when ETOA(n') for an index n' ($1 \leq n' \leq N$) satisfies the relation TTR(begin;n')$-\Delta$t(buffer;1)$\leq$ETOA(n')$\leq$TTR(end;n')$+\Delta$t(buffer;2), determining an alternate vehicle route that begins at the selected origin at the selected time of departure, that ends at the destination, and that does not include a turn at TTR node number n, and returning to step (2);

(7) when ETOA(n) for an index n ($1 \leq n \leq N$) does not satisfy the relation TTR(begin;n)$-\Delta$t(buffer;1)$\leq$ETOA(n)$\leq$TTR(end;n)$+\Delta$t(buffer;2), replacing n by n+1;

(8) when n does not satisfy n$\leq$N+1, returning to step (4); and (9) when n satisfies n$\leq$N+1, displaying, in at least one of visually perceptible form and audibly perceptible form, at least one of (i) at least a portion of the determined vehicle route, (ii) at least a portion of the alternate vehicle route, (iii) an estimated time of arrival of the vehicle at the selected destination for the determined route and (iv) an estimated time of arrival of the vehicle at the selected destination for the alternate vehicle route.

12. The method of claim 11, further comprising the steps of:

(10) determining whether any portion of said determining vehicle route lies in a region that has adopted daylight saving time;

(11) when no portion of said determined vehicle route lies in a region R that has adopted the daylight saving time, making no change in said ETOA at any TTR node, and making no change in said buffered time interval of effectiveness for any TTR node, on said determined vehicle route that reflects applicability of the daylight saving time;

(12) when a portion of said determined vehicle route lies in a region R that has adopted the daylight saving time but no TTR node on said selected optimum route lies in the region R, making no change in said ETOA, and making no change in said buffered time interval of effectiveness for any TTR node, on said determined vehicle route that reflects applicability of the daylight savings time; and

(13) when at least one TTR node on said determined vehicle route lies in the region R that has adopted the daylight savings time, adjusting at least one of said buffered time interval of effectiveness for the TTR node and said ETOA at the TTR node to reflect the applicability of the daylight savings time at that node.

13. The method of claim 11, further comprising the steps of:

(10) determining whether said determined vehicle route will pass through any region that is part of a time zone offset;

(11) when said determined vehicle route will not pass through any region R that is part of the time zone offset, making no change in said buffered time interval of effectiveness of any TTR node, and making no change in said ETOA at a TTR node, on said determined vehicle route that reflects applicability of the time offset;

(12) when said determined vehicle route passes through a region R that is part of the time zone offset but no TTR node on said determined vehicle route lies in the region R, making no change in said buffered time interval of effectiveness of any TTR node, and making no change in said ETOA at a TTR node, that reflects applicability of the time offset; and

(13) when at least one node with an associated TTR on said determined vehicle route lies in the region R that is part of the time zone offset, adjusting at least one of said buffered time interval of effectiveness for the associated TTR and said ETOA at the node with the associated TTR to reflect the applicability of the time offset at that node.

14. The method of claim 11, further comprising the step of selecting at least one of said time values $\Delta$t(buffer;1) and $\Delta$t(buffer;2) to be between 60 and 300 sec.

15. The method of claim 11, further comprising the step of performing at least one of said steps (1), (2), (3), (4), (5), (6), (7), (8) and (9) at a station that is spaced apart from and that communicates with said vehicle.

16. The method of claim 11, further comprising the step of performing at least one of said steps (1), (2), (3), (4), (5), (6), (7), (8) and (9) at said vehicle.

17. A method for determining a route of travel for a vehicle, the method comprising the steps of:

(1) using a computer database to determine a vehicle route from a selected trip origin at a selected time of departure to a selected trip destination;

(2) when the route has no link with an associated timed lane restriction, denoted "TLR," proceeding to step (6);

(3) when at least one link on the route has an associated TLR, denoted a "TLR link," estimating a time of arrival, denoted "ETOA," of the vehicle at least one TLR link on the route;

(4) determining if the ETOA for at least one TLR link on the route lies in a buffered time interval of effectiveness, and when no ETOA for any TLR link on the first route lies in the buffered time interval of effectiveness of the associated TLR, proceeding to step (6);

(5) when the ETOA for at least one TLR link on the route lies in the buffered time interval of effectiveness of the TLR for the TLR link, redetermining a route in which time required to travel along the TLR link is increased by a selected time interval $\Delta t(TLR)$; and (6) displaying, in at least one of visually perceptible form and audibly perceptible form, at least one of (i) at least a portion of the determined route, (ii) at least a portion of the redetermined vehicle route, (iii) an estimated time of arrival of the vehicle at the selected destination for the determined route and (iv) an estimated time of arrival of the vehicle at the selected destination for the redetermined route.

18. The method of claim 17, wherein said step (5) comprises the steps of:

(5A) when said ETOA for said at least one TLR link on said determined route lies in said buffered time interval of effectiveness of said TLR for said at least one TLR link, forming a modified database from the database in which said time required to travel along said at least one TLR link is increased by said selected time interval $\Delta t(TLR)$;

(5B) using the modified database to redetermine a vehicle route from said selected trip origin at said selected time of departure to said selected trip destination; and (5C) replacing said determined route, used to determine whether said ETOA for said at least one TLR link on said determined route lies in said buffered time interval of effectiveness of said TLR in step (5A), by said redetermined route, and returning to step (2).

19. The method of claim 17, wherein said step (3) comprises the step of:

(3') when at least one link on said route is said at least one TLR link, consecutively numbering said TLR links on said route as N=1, ..., N, and estimating said time of arrival, denoted "ETOA(n)," of said vehicle at TLR link number n, where N is the total number of said TLR links on said route.

20. A method for determining a route of travel for a vehicle, the method comprising the steps of:

(1) using a computer database to determine a vehicle route from a selected trip origin at a selected time of departure to a selected trip destination;

(2) when the route has no link with an associated timed lane restriction, denoted "TLR," proceeding to step (6);

(3) when at least one link on said route is the TLR link, consecutively numbering each said TLR link on said route as n=1, ..., N, and estimating said time of arrival, denoted "ETOA(n)," of said vehicle at TLR link number n, where N is the total number of said TLR links on said route.

(4) forming a set S' of said TLR links on said route for which an estimated time of arrival ETOA(n') at a TLR link number n' ($1 \leq n' \leq N$) satisfies the relation TLR(begin;n')−$\Delta t$(buffer;1) $\leq$ ETOA(n') $\leq$ TLR(end;n')+$\Delta t$(buffer;2), where n' is an integer lying between 1 and N, TLR(begin;n') and TLR(end;n') are times at which the TLR number n' begins and ends at the TLR link n', respectively, and $\Delta t$(buffer;1) and $\Delta t$(buffer;2) are selected non-negative time values, and when the set S' is empty, proceeding to step (6);

(5) when the ETOA for at least one TLR link on the route lies in the buffered time interval of effectiveness of the TLR for the TLR link, redetermining a route in which time required to travel along the TLR link is increased by a selected time interval $\Delta t(TLR)$; and (6) displaying, in at least one of visually perceptible form and audibly perceptible form, at least one of (i) at least a portion of the determined route, (ii) at least a portion of the redetermined vehicle route, (iii) an estimated time of arrival of the vehicle at the selected destination for the determined route and (iv) an estimated time of arrival of the vehicle at the selected destination for the redetermined route.

21. The method of claim 20, further comprising the step of selecting at least one of said time values $\Delta t$(buffer;1) and $\Delta t$(buffer;2) to be between 30 and 300 sec.

22. The method of claim 20, wherein said step (5) comprises the step of:

(5') when said set S' is not empty, forming a modified database from the database in which the time required to travel along said TLR link number n' is increased by said selected time interval $\Delta t(TLR)$.

23. The method of claim 20, further comprising the steps of:

(7) determining whether any portion of said determined vehicle route lies in a region that has adopted daylight savings time;

(8) when no portion of said determined vehicle route lies in a region R that has adopted the daylight savings time, making no change in said ETOA at any TLR link, and making no change in said buffered time interval of effectiveness for any TLR link, on said determined vehicle route that reflects applicability of the daylight savings time;

(9) when a portion of said determined vehicle route lies in a region R that has adopted the daylight savings time but no TLR link on said determined vehicle route lies in the region R, making no change in said ETOA, and making no change in said buffered time interval of effectiveness for any TLR link, on said determined vehicle route that reflects applicability of the daylight savings time; and

(10) when at least one TLR link on said determined vehicle route lies in the region R that has adopted the daylight savings time, adjusting at least one of said buffered time interval of effectiveness for the TLR link and said ETOA at the TLR link to reflect the applicability of the daylight savings time at that link.

24. The method of claim 20, further comprising the steps of:

(7) determining whether said determined vehicle route will pass through any region that is part of a time zone offset;

(8) when said determined vehicle route will not pass through any region R that is part of the time zone offset, making no change in said buffered time interval of effectiveness of any TTR node, and making no change in said ETOA at a TLR link, on said selected optimum route that reflects applicability of the time offset;

(9) when said determined vehicle route passes through a region R that is part of the time zone offset but no TLR link on said selected optimum route lies in the region R, making no change in said buffered time interval of effectiveness of any TLR link, and making no change in said ETOA at a TLR link, that reflects applicability of the time offset; and

(10) when at least one TLR link on said determined vehicle route lies in the region R that is part of the time zone offset, adjusting at least one of said buffered time interval of effectiveness for the associated TLR link and said ETOA at the TLR link to reflect the applicability of the time offset at that link.

25. The method of claim 20, further comprising the step of performing at least one of said steps (1), (2), (3), (4), (5) and (6) at a station that is spaced apart from and that communicates with said vehicle.

26. The method of claim 20, further comprising the step of performing at least one of said steps (1), (2), (3) (4), (5) and (6) at said vehicle.

27. A method for determining a route of travel for a vehicle, the method comprising the steps of:

(1) determining a present time and using a computer database to determine a vehicle route from a selected trip origin at a selected time of departure to a selected trip destination;

(2) when the first route has no link with an associated timed lane restriction, denoted "TLR," is present, proceeding to step (9);

(3) when at least one link on the route has an associated TLR, denoted a "TLR link," consecutively numbering the TLR link as n=1, . . . , N, where N is the total number of TLR links present on the first route;

(4) for at least one integer n ($1 \leq n \leq N$), estimating a time of arrival, denoted "ETOA(n)," of the vehicle at TLR link number n;

(5) determining if ETOA(n) satisfies the relation TLR(begin;n)−Δt(buffer;1)≦ETOA(n)≦TLR(end;n)+Δt(buffer;2), where TLR(begin;n) and TLR(end;n) are the times at which the TLR begins and ends at TLR link n, respectively, and Δt(buffer;1) and Δt(buffer;2) are selected non-negative time values;

(6) when ETOA(n') for an index n' ($1 \leq n' \leq N$) satisfies the relation TLR(begin;n')−Δt(buffer;1)≦ETOA(n')≦TLR(end;n')+Δt(buffer;2), determining an alternate vehicle route that begins at the selected origin at the selected time of departure, that ends at the destination, for which the time required for travel, if any, along the TLR link n' is increased by a selected amount Δt(TLR), and returning to step (2);

(7) when ETOA(n) for the index n ($1 \leq n \leq N$) does not satisfy the relation TLR(begin;n)−Δt(buffer;1)≦ETOA(n)≦TLR(end;n)+Δt(buffer;2), replacing n by n+1;

(8) when n does not satisfy n≧N+1, returning to step (4); and (9) when n satisfies n≧N+1, displaying, in visually perceptible form or audibly perceptible form, at least one of (i) at least a portion of the determined vehicle route, (ii) at least a portion of the alternate vehicle route, (iii) an estimated time of arrival of the vehicle at the selected destination for the first route and (iv) an estimated time of arrival of the vehicle at the selected destination for the alternate vehicle route.

28. The method of claim 27, further comprising the steps of:

(10) determining whether any portion of said determined vehicle route lies in a region that has adopted daylight savings time;

(11) when no portion of said determined vehicle route lies in a region R that has adopted the daylight savings time, making no change in said ETOA at any TLR link, and making no change in said buffered time interval of effectiveness for any TLR link, on said determined vehicle route that reflects applicability of the daylight savings time;

(12) when a portion of said determined vehicle route lies in a region R that has adopted the daylight savings time but no TLR link on said determined vehicle route lies in the region R, making no change in said ETOA, and making no change in said buffered time interval of effectiveness for any TLR link, on said determined vehicle route that reflects applicability of the daylight savings time; and

(13) when at least one TLR link on said determined vehicle route lies in the region R that has adopted the daylight savings time, adjusting at least one of said buffered time interval of effectiveness for the TLR link or said ETOA at the TLR link to reflect the applicability of the daylight savings time at that link.

29. The method of claim 27, further comprising the steps of:

(10) determining whether said determined vehicle route will pass through any region that is part of a time zone offset;

(11) when said determined vehicle route will not pass through any region R that is part of the time zone offset, making no change in said buffered time interval of effectiveness of any TLR link, and making no change in said ETOA at a TLR link, on said determined vehicle route that reflects applicability of the time offset;

(12) when said determined vehicle route passes through a region R that is part of the time zone offset but no TLR link on said determined vehicle route lies in the region R, making no change in said buffered time interval of effectiveness of any TLR link, and making no change in said ETOA at a TLR link, that reflects applicability of the time offset; and

(13) when at least one node with an associated TLR on said determined vehicle route lies in the region R that is part of the time zone offset, adjusting at least one of said buffered time interval of effectiveness for the associated TLR or said ETOA at the TLR link to reflect the applicability of the time offset at that link.

30. The method of claim 27, further comprising the step of selecting at least one of said time values Δt(buffer;1) and Δt(buffer;2) to be between 60 and 300 sec.

31. The method of claim 27, further comprising the step of performing at least one of said steps (1), (2), (3), (4), (5), (6), (7), (8) and (9) at a central station that is spaced apart from and that communicates with said vehicle.

32. The method of claim 27, further comprising the step of performing at least one of said steps (1), (2), (3), (4), (5), (6), (7), (8) and (9) at said vehicle.

33. A method for determining or redetermining a route of travel for a vehicle that is enroute, the method comprising the steps of:

(1) determining a present time and a present location for a vehicle, and using a computer to provide a determined route from the vehicle present location to a selected destination, beginning at a selected time no earlier than the present time;

(2) when the route has no node with an associated timed turn restriction, denoted "TTR," proceeding to step (8);

(3) when at least one node on the route exists with an associated TTR, denoted a "TTR node," estimating a time of arrival, denoted "ETOA," of the vehicle at at least one TTR node on the route;

(4) when the ETOA for each TTR node on the route does not lie in a buffered time interval of effectiveness of the TTR for the TTR node, proceeding to step (8);

(5) where at least one TTR node exists on the route for which the ETOA at the TTR node lies within the buffered time interval of effectiveness for the TTR, redetermining a route, from the vehicle present location to the selected destination, in which a turn at the TTR node is not permitted;

(6) displaying, in at least one of visually perceptible form and audibly perceptible form, at least one of (i) at least a portion of the redetermined route and (ii) an estimated time of arrival of the vehicle at the selected destination using the redetermined route;

(7) replacing the determined route, used to determine the ETOA at the TTR node in step (5), by the redetermined route from the vehicle present location to the selected destination;

(8) comparing the vehicle present location with the location of the selected destination;

(9) when the vehicle has reached the selected destination, proceeding to step (14);

(10) when the vehicle has not reached the selected destination, determining whether the vehicle is following the route;

(11) when the vehicle is following the route, returning to step (2);

(12) when the vehicle is not following the route, reascertaining and displaying, in at least one of visually perceptible form and audibly perceptible form, at least a portion of a reascertained route from the vehicle present location to the selected destination, beginning at the present time;

(13) replacing the route, used to determine whether the vehicle is following the route in step (10), by the reascertained route, and returning to step (2); and

(14) indicating that the vehicle has reached the selected destination.

34. The method of claim 33, wherein said step of determining whether said vehicle is following said route in said step (10) comprises the steps of:

tracking said vehicle location;

determining if said vehicle location is within a selected distance $d_{thr}$ from said route; and when said vehicle is within the predetermined distance $d_{thr}$ from said route, determining that said vehicle is following said route.

35. The method of claim 34, further comprising the steps of:

determining and storing at least one sub-optimal route from said vehicle present location to said selected destination; and when no TTR node exists on the route for which the ETOA at this TTR node lies within said buffered time interval of effectiveness for this TTR node, examining at least one sub-optimal route as a candidate route in determining said redetermined route in said step (5).

36. The method of claim 33, further comprising the steps of:

determining and storing at least one sub-optimal route from said vehicle present location to said selected destination; and when said vehicle is following said route, examining at least one sub-optimal route as a candidate route in ascertaining said reascertained route in said step (12).

37. The method of claim 33, further comprising the step of:

when said vehicle has reached said selected destination, terminating monitoring of said vehicle present location.

38. A method for determining or redetermining a route of travel for a vehicle that is enroute, the method comprising the steps of:

(1) determining a present time and a present location for a vehicle, and using a computer to provide a determined route from the vehicle present location to a selected destination, beginning at a selected time no earlier than the present time;

(2) when the route has no link with an associated timed lane restriction, denoted "TLR," proceeding to step (8);

(3) when at least one link on the route exists with an associated TLR, denoted a "TLR link," estimating a time of arrival, denoted "ETOA," of the vehicle at at least one TLR link on the route;

(4) when the ETOA for each TLR link on the route does not lie in a buffered time interval of effectiveness of the TLR for the TLR link, proceeding to step (8);

(5) where at least one link exists on the route for which a TLR is present and for which the ETOA at the TLR link lies within the buffered time interval of effectiveness for the TLR, adding an estimated non-negative time increment to the time required to travel along the TLR link because of presence of the lane restriction, and redetermining a route from the vehicle present location to the selected destination, taking into account the time increment added to the time required to travel along the TLR link;

(6) displaying, in at least one of visually perceptible form and audibly perceptible form, at least one of (i) at least a portion of the redetermined route and (ii) an estimated time of arrival of the vehicle at the selected destination using the redetermined route;

(7) replacing the determined route, used to determine the ETOA at the TLR link in step (5), by the redetermined route from the vehicle present location to the selected destination;

(8) comparing the vehicle present location with the location of the selected destination;

(9) when the vehicle has reached the selected destination, proceeding to step (14);

(10) when the vehicle has not reached the selected destination, determining whether the vehicle is following the route;

(11) when the vehicle is following the route, returning to step (2);

(12) when the vehicle is not following the route, reascertaining and displaying, in at least one of visually perceptible form and audibly perceptible form, at least a portion of a reascertained route from the vehicle present location to the selected destination, beginning at the present time;

(13) replacing the route, used to determine whether the vehicle is following the route in step (10), by the reascertained route, and returning to step (2); and

(14) indicating that the vehicle has reached the selected destination.

39. The method of claim 38, wherein said step of determining whether said vehicle is following said route in said step (10) comprises the steps of:

tracking said vehicle location;

determining if said vehicle location is within a selected distance $d_{thr}$ from said route; and when said vehicle is within the predetermined distance $d_{thr}$ from said route, determining that said vehicle is following said route.

40. The method of claim 39, further comprising the steps of:

determining and storing at least one sub-optimal route from said vehicle present location to said selected destination; and when no TLR link exists on the route for which the ETOA at this TLR link lies within said buffered time interval of effectiveness for this TLR link, examining at least one sub-optimal route as a candidate route in determining said redetermined route in said step (5).

41. The method of claim 38, further comprising the steps of:

determining and storing at least one sub-optimal route from said vehicle present location to said selected destination; and when said vehicle is following said route examining at least one sub-optimal route as a candidate route in ascertaining said reascertained route in said step (12).

42. The method of claim 38, further comprising the step of:

when said vehicle has reached said selected destination, terminating monitoring of said vehicle present location.

43. Apparatus for determining a route of travel for a vehicle that is enroute, the apparatus comprising:

a location determination system, denoted an "LD" system and carried on said vehicle, that receives LD signals and estimates or obtains (i) the present time and (ii) the present location of said vehicle, a display that can receive and visually or audibly display at least one of (a) an estimate of the vehicle present location and (b) at least a portion of a vehicle route; and a microprocessor and associated memory that contains information on a selected destination, that receives information on at least one of (i) the present time and (ii) the vehicle present location, and that is programmed to perform the following steps:

(1) determining a route from the vehicle present location to the selected destination, beginning at a time no earlier than the present time;

(2) when the route has no node with an associated timed turn restriction, denoted "TTR," proceeding to step (8);

(3) when at least one node on the route exists with an associated TTR, denoted a "TTR node," estimating a time of arrival, denoted "ETOA," of the vehicle at at least one TTR node on the route;

(4) when the ETOA for each TTR node on the route does not lie in a buffered time interval of effectiveness of the TTR for the TTR node, proceeding to step (8);

(5) when at least one TTR node exists on the route for which the ETOA at the TTR node lies within the buffered time interval of effectiveness for the TTR, redetermining a route, from the vehicle present location to the selected destination, in which a turn at the TTR node is not permitted;

(6) displaying, in at least one of visually perceptible form and audibly perceptible form, at least one of (i) at least a portion of the redetermined route and (ii) an estimated time of arrival of the vehicle at the selected destination using the redetermined route;

(7) replacing the route, used to determine the ETOA at the TTR node in step (5), by the redetermined route from the vehicle present location to the selected destination;

(8) comparing the vehicle present location with the location of the selected destination;

(9) when the vehicle has reached the selected destination, proceeding to step (14);

(10) when the vehicle has not reached the selected destination, determining whether the vehicle is following the route;

(11) when the vehicle is following the route, returning to step (2);

(12) when the vehicle is not following the route, reascertaining and displaying, in visually perceptible form or audibly perceptible form, a reascertained route from the vehicle present location to the selected destination, beginning at the present time;

(13) replacing the route, used to determine whether the vehicle is following the route in step (10), by the reascertained route, and returning to step (2); and

(14) indicating that the vehicle has reached the selected destination.

44. Apparatus for determining a route of travel for a vehicle that is enroute, the apparatus comprising:

a location determination system, denoted an "LD" system and carried on said vehicle, that receives LD signals and estimates or obtains (i) the present time and (ii) the present location of said vehicle, a display that can receive and visually or audibly display at least one of (a) an estimate of the vehicle present location and (b) at least a portion of a vehicle route; and a microprocessor and associated memory that contains information on a selected destination, that receives information on at least one of (i) the present time and (ii) the vehicle present location, and that is programmed to perform the following steps:

(1) determining a route from the vehicle present location to the selected destination, beginning at a time no earlier than the present time;

(2) when the route has no link with an associated timed lane restriction, denoted "TLR," proceeding to step (8);

(3) when at least one link on the route exists with an associated TLR, denoted a "TLR link," estimating a time of arrival, denoted "ETOA," of the vehicle at at least one TLR link on the route;

(4) when the ETOA for each TLR link on the route does not lie in a buffered time interval of effectiveness of the TLR for the TLR link, proceeding to step (8);

(5) where at least one link exists on the route for which a TLR is present and for which the ETOA at the TLR link lies within the buffered time interval of effectiveness for the TLR, adding an estimated non-negative time increment to the time required to travel along the TLR link because of presence of the lane restriction, and redetermining a route from the vehicle present location to the selected destination, taking into account the time increment added to the time required to travel along the TLR link;

(6) displaying, in at least one of visually perceptible form or audibly perceptible form, at least one of (i) at least a portion of the redetermined route and (ii) an estimated time of arrival of the vehicle at the selected destination using the redetermined route;

(7) replacing the route, used to determine the ETOA at the TLR link in step (5), by the redetermined route from the vehicle present location to the selected destination;

(8) comparing the vehicle present location with the location of the selected destination;

(9) when the vehicle has reached the selected destination, proceeding to step (14);
(10) when the vehicle has not reached the selected destination, determining whether the vehicle is following the route;
(11) when the vehicle is following the route, returning to step (2);
(12) when the vehicle is not following the route, reascertaining and displaying, in visually perceptible form or audibly perceptible form, a reascertained route from the vehicle present location to the selected destination, beginning at the present time;
(13) replacing the route, used to determine whether the vehicle is following the route in step (10), by the reascertained route, and returning to step (2); and
(14) indicating that the vehicle has reached the selected destination.

* * * * *